United States Patent
Kelly

(10) Patent No.: US 8,635,281 B2
(45) Date of Patent: Jan. 21, 2014

(54) SYSTEM AND METHOD FOR ATTENTIVE CLUSTERING AND ANALYTICS

(75) Inventor: John W. Kelly, New York, NY (US)

(73) Assignee: Morningside Analytics, Inc., New York, NY (US)

( * ) Notice: Subject to any disclaimer, the term of this patent is extended or adjusted under 35 U.S.C. 154(b) by 603 days.

(21) Appl. No.: 12/973,296

(22) Filed: Dec. 20, 2010

(65) Prior Publication Data

US 2011/0173264 A1 Jul. 14, 2011

Related U.S. Application Data

(60) Provisional application No. 61/287,766, filed on Dec. 18, 2009.

(51) Int. Cl.
*G06F 15/16* (2006.01)

(52) U.S. Cl.
USPC .......................................... 709/205; 709/224

(58) Field of Classification Search
None
See application file for complete search history.

(56) References Cited

U.S. PATENT DOCUMENTS

| | | | | |
|---|---|---|---|---|
| 6,470,383 B1 * | 10/2002 | Leshem et al. | ............... | 709/223 |
| 7,503,070 B1 * | 3/2009 | Alstyne et al. | .................. | 726/22 |
| 2004/0098280 A1 * | 5/2004 | Hubert | ............... | 705/1 |
| 2005/0256949 A1 * | 11/2005 | Gruhl et al. | ................... | 709/223 |
| 2008/0215607 A1 * | 9/2008 | Kaushansky et al. | ......... | 707/102 |
| 2008/0222295 A1 * | 9/2008 | Robinson et al. | ............. | 709/227 |

* cited by examiner

*Primary Examiner* — Mohamed Ibrahim
(74) *Attorney, Agent, or Firm* — The Webb Law Firm

(57) ABSTRACT

Attentive clustering includes constructing an online author network, wherein constructing includes selecting a set of source nodes (S), a set of outlink targets (T) from a selected type or types of hyperlinks, and a set of edges (E) between S and T defined by the selected hyperlinks, constructing a matrix of source nodes in S linked to targets in T', wherein T' is derived by normalizing nodes in T, and partitioning the network into at least one set of source nodes with a similar linking history to form an attentive cluster and at least one set of outlink targets with a similar citation profile to form an outlink bundle. Attentive clustering may further include applying any lists specifying inclusion or exclusion of particular nodes. Frequencies of links between attentive clusters and outlink bundles may be measured and analyzed.

21 Claims, 13 Drawing Sheets

400

600

SYSTEM AND METHOD FOR ATTENTIVE CLUSTERING AND ANALYTICS

CROSS REFERENCE TO RELATED APPLICATIONS

This application claims priority to U.S. Provisional Patent Application No. 61/287,766, filed Dec. 18, 2009, entitled "System and Method for Attentive Clustering and Analytics" which is hereby incorporated by reference.

BACKGROUND OF THE INVENTION

1. Field of the Invention

The present invention relates to methods for attentive clustering of online authors, targets of attention, and related analytics.

2. Description of the Related Art

Internet-based technologies, and the manifold genres of interaction they afford, are re-architecting public and private communications alike and thus altering the relationships between all manner of social actors, from individuals, to organizations, to mass media institutions. Internet technologies have enabled shifts in methods and practices of interpersonal communication. Many-to-many and social scale-spanning Internet communications technologies are eliminating the channel-segregation that previously reinforced the independence of classes of actors at these levels of scale, enabling (or more accurately in many cases, forcing) them to represent themselves to one another via a common medium, and increasingly in ways that are universally visible, searchable and persistent.

Online readers typically navigate hyperlinked chains of related stories, bouncing between numerous websites in a hypertext network, returning periodically to favored starting points to pick up new trails. Hyperlinks result from a combination of choices, from those made by individual, autonomous authors to those made programmatically by designed systems, such as permalinks, site navigation, embedded advertising, tracking services, and the like. Human authors practice the same kind of information selectivity online that they do offline, i.e. what authors (including those representing organizations) write about and link to reflects somewhat stable interests, attitudes, and social/organizational relationships. The structure of the network formed by these hyperlinks is a product of these choices, and thus large-scale regularities in choices will be evident in macro-level structure. This structure will thus bear the mark of individual preferences and characteristics of designed systems and suggests a kind of "flow map" of how the Internet channels attention to online resources. Discriminating among types of links, and the ability to select categories of those which represent author choices, allows structural analytics to discover similarities among authors. Errors, randomness, or noise in linking at the individual level has local, independent causes, and does not bias large-scale macro patterns.

Thus, in order to understand and leverage the online information ecosystem, there remains a need for systems and methods for structural analytics aimed at identifying clusters of online readers and influential authors, discovering how they drive traffic to particular online resources, and leveraging that knowledge across various applications ranging from targeted advertising and communication to expert identification, and the like.

SUMMARY OF THE INVENTION

In an aspect of the invention, a computer-readable storage medium with an executable program stored thereon, wherein the program instructs a processor to perform the steps of attentive clustering and analysis, may include constructing an online author network, wherein constructing the online author network includes selecting a set of source nodes (S), a set of outlink targets (T) from at least one selected type of hyperlink, and a set of edges (E) between S and T defined by the at least one selected type of hyperlink from S to T during a specified time period; deriving a set of nodes, T', by any combination of a.) normalizing nodes in T, optionally to a selected level of abstraction, b.) using lists of target nodes for exclusion ("blacklists"), and c.) using lists of target nodes for inclusion ("whitelists"); transforming the online author network into a matrix of source nodes in S linked to targets in T'; partitioning the online author network into at least one set of source nodes with a similar linking history to form an attentive cluster and/or at least one set of outlink targets with a similar citation profile to form an outlink bundle; optionally, generating a graphical representation of attentive clusters and/or outlink bundles in the network to enable interpretation of network features and behavior and calculation of comparative statistical measures across the attentive clusters and outlink bundles; wherein at least one element of the graphical representation depicts a measure of an extent of a type of activity within the network; and measuring frequencies of links between attentive clusters and outlink bundles enabling identification and measurement of large-scale regularities in the distribution of attention by online authors across sources of information. The element of the graphical representation may use at least one of size, thickness, color and pattern to depict a type of activity. Attentive clusters and their constituent nodes may be differentiated in the graphical representation by at least one of a color, a shape, a shading, and a size. The size of the object representing the clustered nodes in the graphical representation may correlate with a metric. The nodes, targets, and edges may be collected from public and private sources of information. Constructing the matrix may include applying at least one threshold parameter from the group consisting of: maxnodes, targetmax, nodemin, targetmin, maxlinks, and linkmin. Constructing the matrix may include applying a minimum threshold for the number of included nodes that must link to a target to qualify it for inclusion in the matrix. Constructing the matrix may include applying a minimum threshold for the number of included targets that must link to a node to qualify it for inclusion in the matrix. The matrix may be a graph matrix. The method may further include applying any lists specifying inclusion or exclusion of particular nodes.

In an aspect of the invention, a method of using attentive clustering to steer a further data collection process may include partitioning an online author network into at least one set of source nodes with a similar linking history to form an attentive cluster and at least one set of outlink targets with a similar citation profile to form an outlink bundle, and collecting clickstream data for the source nodes of the attentive cluster.

In an aspect of the invention, a method of using attentive clustering to steer a further data collection process may include partitioning an online author network into at least one set of source nodes with a similar linking history to form an attentive cluster and at least one set of outlink targets with a similar citation profile to form an outlink bundle, and collecting clickstream data for the target nodes of the outlink bundle.

In an aspect of the invention, a method of using attentive clustering to steer a further data collection process may include partitioning an online author network into at least one set of source nodes with a similar linking history to form an attentive cluster and at least one set of outlink targets with a similar citation profile to form an outlink bundle, and collecting survey data for the source nodes of the attentive cluster.

In an aspect of the invention, a method of using attentive clustering to steer a further data collection process may include partitioning an online author network into at least one set of source nodes with a similar linking history to form an attentive cluster and at least one set of outlink targets with a similar citation profile to form an outlink bundle, and collecting survey data for the target nodes of the outlink bundle.

In an aspect of the invention, a method of using attentive clustering to steer a further data collection process may include partitioning an online author network into at least one set of source nodes with a similar linking history to form an attentive cluster and at least one set of outlink targets with a similar citation profile to form an outlink bundle, and collecting geo-location data for the source nodes of the attentive cluster.

In an aspect of the invention, a method of using attentive clustering to steer a further data collection process may include partitioning an online author network into at least one set of source nodes with a similar linking history to form an attentive cluster and at least one set of outlink targets with a similar citation profile to form an outlink bundle, and collecting geo-location data for the target nodes of the outlink bundle.

In an aspect of the invention, a method of metadata tag analysis to facilitate interpretation of an attentive cluster may include partitioning an online author network into at least one set of source nodes with a similar linking history to form an attentive cluster and at least one set of outlink targets with a similar citation profile to form an outlink bundle, collecting a metadata tag associated with the source nodes in the attentive cluster, and performing a differential frequency analysis on the metadata tags that are associated with the attentive cluster. The method may further include sorting cluster focus scores on a plurality of the metadata tags.

In an aspect of the invention, a method of metadata tag analysis to facilitate interpretation of an attentive cluster may include partitioning an online author network into at least one set of source nodes with a similar linking history to form an attentive cluster and at least one set of outlink targets with a similar citation profile to form an outlink bundle, collecting a metadata tag associated with the source nodes in the attentive cluster, and performing a differential frequency analysis on the metadata tags that are associated with the outlink bundle. The method may further include sorting cluster focus scores on a plurality of the metadata tags.

In an aspect of the invention, a method may include partitioning an online author network into at least one set of source nodes with a similar linking history to form an attentive cluster and at least one set of outlink targets with a similar citation profile to form an outlink bundle, forming a density matrix of the attentive cluster and the outlink bundle, determining where there is a higher density in the density matrix than chance would predict, and identifying patterns of influence of a block of web sites on a block of authors by analyzing the higher density area of the density matrix.

In an aspect of the invention, a method of macro measurement of link density may include constructing an online author network, wherein constructing the online author network comprises selecting a set of source nodes (S), a set of outlink targets (T), and a set of edges (E) between S and T defined by the at least one selected type of hyperlink from S to T during a specified time period, deriving a set of nodes, T', by normalizing nodes in T, transforming the online author network into a matrix of source nodes in S linked to targets in T', and collapsing the matrix to aggregate link measures among clusters of sources and clusters of targets. The aggregated link measure may be at least one of a count of the number of nodes in source cluster s linking to any member of target set t, a density calculated by dividing counts by the product of the number of members in s and the number of members in t; and a standard score that is a standardized measure of the deviation from random chance for counts across each source node—outlink target crossing in the density matrix.

In an aspect of the invention, a method may include partitioning an online author network into at least one set of source nodes with a similar linking history to form an attentive cluster and at least one set of outlink targets with a similar citation profile to form an outlink bundle, and associating the attentive cluster with a real world group of people.

In an aspect of the invention, a method of multi-layer attentive clustering may include partitioning a multi-layered social segmentation into at least one set of source nodes with a similar linking history to form an attentive cluster and at least one set of outlink targets with a similar citation profile to form an outlink bundle, and monitoring at least one of the attentive cluster and the outlink bundle on at least one layer of the social segmentation. The social segmentation may be an online social media author network. Monitoring may be tracking the growth of an attentive cluster over time. The method may further include examining a source node associated with a specific player in the attentive cluster in order to determine a characteristic. The monitoring may be used to identify a group of people who are susceptible to a message and track downstream activities in response to the message.

In an aspect of the invention, a method may include partitioning an online author network into at least one set of source nodes with a similar linking history to form an attentive cluster and at least one set of outlink targets with a similar citation profile to form an outlink bundle, and analyzing the attentive cluster over time to depict changes in a linking pattern of the attentive cluster over a time period. The outlink bundle may be a list of semantic markers. The semantic marker may be at least one of a text element, a post, a tweet, an online content, and a metadata tag. Analyzing may involve tracking a semantic marker or set of semantic markers across one or more attentive clusters within the online author network.

In an aspect of the invention, a method may include partitioning an online author network into at least one set of source nodes with a similar linking history to form an attentive cluster and at least one set of outlink targets with a similar citation profile to form an outlink bundle, and calculating a set of cluster focus index (CFI) scores for the attentive cluster, wherein the CFI represents the degree to which a particular outlink target is disproportionately cited by members of a particular attentive cluster as compared to the average citation frequency for all nodes in S. At least one source node may be a high attention source node. The method may further include automatically placing an advertisement at the particular outlink target.

In an aspect of the invention, a method may include partitioning an online author network into at least one set of source nodes with a similar linking history to form an attentive cluster and at least one set of outlink targets with a similar citation profile to form an outlink bundle, and generating a graphical representation of attentive clusters and/or outlink bundles in the network to enable interpretation of network features and behavior and calculation of comparative statistical measures across the attentive clusters and outlink bundles, wherein at least one element of the graphical representation depicts a measure of an extent of a type of activity within the network. The method may further include further segmenting the network using at least one of a text, an item of online content, a link, and an object. The source node in the graphical representation may be represented by an individual dot. The size of the dot may be determined based on the number of other source nodes that link to it.

In an aspect of the invention, a method may include partitioning an online author network into at least one set of source nodes with a similar linking history to form an attentive cluster and at least one set of outlink targets with a similar citation profile to form an outlink bundle, calculating a set of cluster focus index (CFI) scores (CFI) for the attentive cluster, wherein the CFI represents the degree to which a particular outlink target is disproportionately cited by at least one source node of a particular attentive cluster, and generating a graphical representation of attentive clusters and/or outlink bundles in the network, wherein at least one element of the graphical representation depicts a measure of an extent of a type of activity within the network, wherein the higher the CFI score, the higher the outlink target appears along at least one axis of the graphical representation, In an aspect of the invention, a method of attentive clustering may include defining a semantic bundle, searching a plurality of candidate nodes for items in the bundle in order to generate a relevance metric for use in selecting high-relevance online authors, partitioning the online author network into at least one set of source nodes with a similar linking history to form an attentive cluster and at least one set of outlink targets with a similar citation profile to form an outlink bundle, and calculating metrics with across clusters for items in the semantic bundle.

In an aspect of the invention, a method may include partitioning an online author network into at least one set of source nodes with a similar linking history to form an attentive cluster and at least one set of outlink targets with a similar citation profile to form an outlink bundle, and generating a graphical representation of link targets, semantic events, and node-associated metadata scattered in an x-y coordinate space, wherein the dimensions of the graph are custom-defined using sets of attentive clusters grouped to represent substantive dimensions of interest for a particular analysis.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWINGS

The invention and the following detailed description of certain embodiments thereof may be understood by reference to the following figures.

DETAILED DESCRIPTION OF THE PREFERRED EMBODIMENTS

Figure 1:
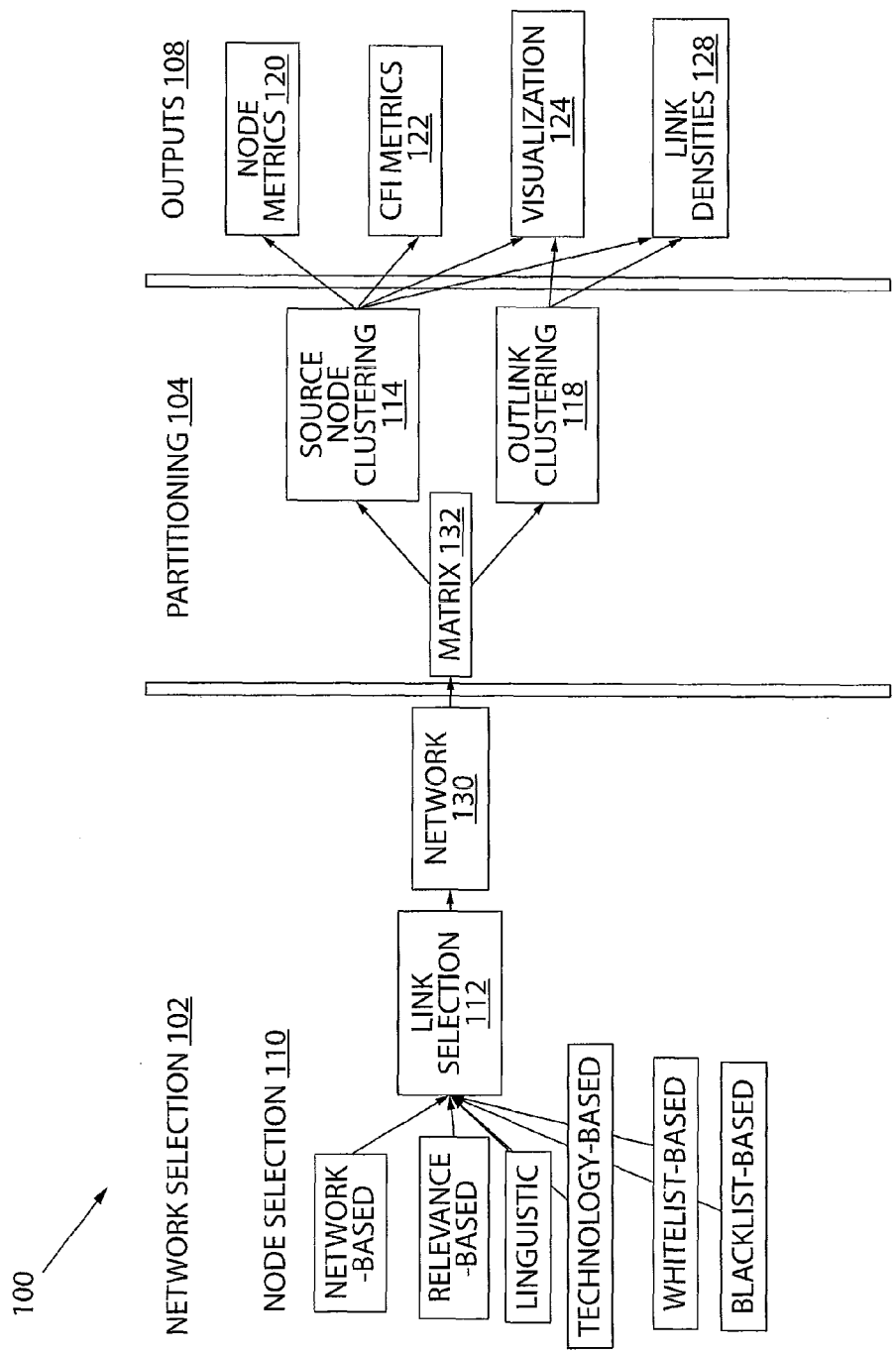
FIG. 1 depicts a process flow for attentive clustering.

The present invention relates to a computer-implemented method for attentive clustering and analysis. Attentive clusters are groups of authors who share similar linking profiles or collections of nodes whose use of sources indicates common attentive behavior. Attentive clustering and related analytics may include measuring and visualizing the prominence and specificity of textual elements, semantic activity, sources of information, and hyperlinked objects across emergent categories of online authors within targeted subgraphs of the global Internet. The invention may include a set of specialized parsers that identify and extract online conversations. The invention may include algorithms that cluster data and map them into intuitive visualizations (publishing nodes, blogs, tweets, etc.) to determine emergent clusterings that are highly navigable. The invention may include a front end/dashboard for interaction with the clustering data. The invention may include a database for tracking clustering data. The invention may include tools and data to visualize, interpret and act upon measurable relationships in online media. The approach may be to segment an online landscape based on behavior of authors over time, thus creating an emergent segmentation of authors based on real behavior that drives metrics, rather than driving metrics based on pre-conceived lists. Because the analysis is a structural one, rather than language-based, the analysis is language agnostic. In an embodiment, the segmentation may be global, such as of the English language blogosphere. In an embodiment, the segmentation may involve a relevance metric for every node based on semantic markers and a custom mapping of high-relevance nodes. The invention enables identifying influencers, such as who is authoritative about what to whom.

One method of obtaining attentive clusters may involve construction of a bipartite matrix, however, any number and variety of flat or hierarchical clustering algorithms may be used to obtain an attentive cluster in the invention. In an embodiment, a set of content-publishing source nodes ("authors") may be selected based on a chosen combination of linguistic, behavioral, semantic, network-based or other criteria. A mixed-mode network may be constructed, comprising the set S of all source nodes, the set T of all outlink targets from selected types of hyperlinks, and the set E of edges between them defined by the selected type or types of links from S to T found during a specified time period. A matrix, such as a bipartite graph matrix, may be constructed of source nodes in S linked to targets in T', derived by any combination of a.) normalizing nodes in T, optionally to a selected level of abstraction, b.) using lists of target nodes for exclusion ("blacklists"), and c.) using lists of target nodes for inclusion ("whitelists"). The matrix may represent a two-mode network (or actor-event network) that associates two completely different categories of nodes, actors and events, to build a network of actors through their participation in events or affiliations. In embodiments, the matrix is, in effect, an affiliation matrix of all authors with the things that they link to, wherein the patterns of their linking may be used to do statistical clustering of their nodes.

The matrix may be processed according to user-selected parameters, and clustered in order to perform one or more of the following: 1.) partition the network into sets of source nodes with similar linking histories ("attentive clusters"); 2.) identify sets of targets (linked-to websites or objects) with similar citation profiles ("outlink bundles"); 3.) calculate comparative statistical measures across these partitions/attentive clusters; 4.) construct visualizations to aid in interpretation of network features and behavior; 5.) measure frequencies of links between attentive clusters and outlink bundles, allowing identification and measurement of large-scale regularities in the distribution of attention by authors across sources of information, and the like. An arbitrary number and variety of flat or hierarchical clustering algorithms may be used to partition the matrix, and the results may be stored in order to select any solution for output generation. The resulting outputs (measures and visualizations) may provide novel, unique, and useful insights for determining influential authors and websites, planning communications strategies, targeting online advertising, and the like.

In an embodiment, systems and methods for attentive clustering and analysis may be embodied in a computer system comprising hardware and software elements, including local or network access to a corpus of chronologically-published internet data, such as blog posts, RSS feeds, online articles, Twitter "tweets," and the like.

Referring to FIG. 1, attentive clustering and analysis may include: 1.) network selection 102, 2.) partitioning 104, which may include two-mode network clustering in this embodiment, and 3.) visualization and metrics output 108. Network selection 102 may include at least two operations: a.) node selection 110, and b.) link selection 112. Optionally, a third may be applied in which network analytic operations are used to further specify the set of source nodes under consideration for clustering. For example, the operation may be filtering. Filtering may be technology-based, blacklist-based, whitelist-based, and the like.

In an embodiment, nodes may be URLs at which chronologically published streams or elements of content may be available. An initial set containing any number of nodes may be selected based on any combination of node-level characteristics and/or calculated relevance scores. Regarding node-level characteristics, there may be a number of different kinds of nodes publishing content online, such as weblogs (blogs), online media sites (like newspaper websites), microblogs (like TWITTER), forums/bulletin boards (like http://www-.biology-online org/biology-forum/), feeds (like RSS/ATOM), and the like. In addition to different technical genres of node, nodes may differ according to an arbitrary number of other intrinsic or extrinsic node-level characteristics, such as the hosting platform (e.g. BLOGSPOT, LIVEJOURNAL), the type of content published (text, images, audio), languages of textual content (e.g., French, Spanish), type of authoring entity (individual, group, corporation, NGO, government, online content aggregator, etc.), frequency or regularity of publication (daily, regular, monthly, bursty), network characteristics (e.g. central, authoritative, A-list, isolated, un-linked, long-tail), readership/traffic levels, geographical or political location of authoring entity or focus of its concern (e.g. Russian language, Russian Federation, Bay Area California), membership in a particular online ad distribution network (e.g. BLOGADS, GOOGLE ADSENSE), third-party categorizations, and the like.

To support node selection 110 based on relevance to particular issues or actors, or relevance-based node selection 110, lists of relevance markers may be used to calculate composite scores across nodes. These lists may include such items as key words and phrases, semantic entities, full or partial URLs, meta tags embedded in site code and/or published documents, associated tags in third-party collections (e.g. DELICIOUS tags), and the like. For example, tags may be collected automatically, such as by 'spidering' sites for meta keywords. The corpus of internet data may be scanned and matches on list elements tabulated for each node. A number of methods may be used to calculate a relevance score based on these match counts. In an embodiment, relevance scores may be calculated by calculating individual index scores for text matches (T), link matches (L), and metadata matches (M), and then summing them. These individual index scores (I) may be calculated for each node by scanning all content published by a node during a specified period of time using a list of j relevance markers: $I=\text{sum}((x_1 * w_1)/t_1 + (x_2 * V_2)/t_2 \ldots (x_j * w_j)t_j)$, where x is the number of matches for the item, w is a user-assigned weight (a scale of 1 to 5 is typical), and t is the total number of item matches in the scanned corpus. In an example, an initial set of source nodes may include the 100,000 Russian language weblogs most highly cited during a particular time frame. In another example, the initial set may include the 10,000 English language weblogs with the highest relevance scores based on relevance marker lists associated with the political issue of healthcare. In another example, the initial set may include all nodes by Indian and Pakistani authors in whatever language that have published at least three times within the past six months.

With respect to the link selection 112 component of network selection 102, objects may be particular units of chronologically published content found at a node, such as blog posts, "tweets", and the like. Links, also referred to as outlinks herein, may be hyperlink URLs found within a node's source HTML code or its published objects. Many kinds of links exist, and the ability to choose which kinds are used for clustering may be a key feature of the method. There are links for navigation, links to archives, links to servers for embedded advertising, links in comments, links to link-tracking services, and the like. Link selection 112 may be applied to links that represent deliberate choices made by authors, of which there may also be many kinds. These links may be to nodes (e.g. a weblog address found in a "blogroll"), objects (e.g. a particular YOUTUBE video embedded in a blog post), and other classes of entity, such as "friends" and "followers." Some node hosting platforms define a typology of links to reflect explicitly defined relationships, such as "friend," "friend-of," "community member," and "community follower" in LIVEJOURNAL, or "follower" and "following" in TWITTER, and the like. In other cases, informal conventions, such as "blogrolls," define a type of link. Some of these link types are relatively static, meaning they are typically available as part of the interface used by a visitor to a node website, while others are dynamic, embedded within published content objects. Link types may be parsed or estimated and stored with the link data. These links represent different types of relationships between authors and linked entities, and therefore according to the user's objectives, certain classes of links may be selected for inclusion. Different sorts of links also have time values associated with them, such as the date/time of initial publication of an object in which a dynamic link is embedded, or the first-detected and most recently seen date/time of a static link. Links may be further selected for clustering based on these time values.

From the parameters defined for node selection 110 and link selection 112, a mixed-mode network X 130 may be constructed, consisting of the set S of all source nodes, the set T of all outlink targets from selected types of hyperlinks, and the set E of edges between them defined by the selected type or types of links from S to T found during a specified time period. The network 130 may be considered "mixed mode" because while it may be formally bipartite, a number of nodes in S may also exist in T, which may be considered a violation of the normal concept of two-mode networks. Rather than excluding nodes that may be considered either S or T nodes, the systems and methods of the present invention consider them logically separate. A particular node may be considered a source of attention (S) in one mode, and an object of attention (T) in the other. Before clustering, the set of nodes may be further constrained by parameters applied to X, or to a one-mode subnetwork X' consisting of the network 130 defined by nodes in S along with all nodes in T that are also in S (or at a level of abstraction under an element in S, collapsed to the parent node). Standard network analytic techniques may be applied to X' in order to reduce the source nodes under consideration for clustering. For instance, requirements for k-connectedness may be applied in order to limit consideration to well-connected nodes.

In an embodiment, partitioning 104 may include: 1.) specification of node level for building the two-mode network, 2.) assembly of bipartite network matrix 132 using iterative processing of matrix to conform with chosen threshold parameters, and 3.) statistical clustering (multiple methods possible) of nodes on each mode, that is, source node clustering 114 and outlink clustering 118. Outlink clustering 118 to form an outlink bundle may involve identifying sets of web sites that are accessed by the same kinds of people.

With respect to specification of node level, distinction may be made between "nodes" and "objects," considering the node as a stable URL at which a number of objects are published. This may result in generation of a straightforward two-level hierarchy (object-node); however, nodes sometimes have a hierarchical relationship among each other (object-node-metanode). Consider the following three URLs: 1) http://www.bloghost.com/; 2) http://www.bloghost.com/users/johndoe/blog/; and 3) http://www.bloghost.com/users/johndoe/blog/09/6/21/myblogpost.html. Here, a three-level hierarchy with a metanode [1], node [2], and object exists. In some embodiments, the node URL may correspond very simply to a "hostname" (the part of a URL after "Error! Hyperlink reference not valid." and before the next "/") or a hostname plus a uniform path element (like "/blog" after the hostname). In other embodiments though, multiple nodes may exist at pathnames under the same hostname. Depending on the objective of the user, a "node level" may be selected for building the two-mode network, such that second mode nodes include (from most general to most specific level) a.) metanodes (collapsing sub-nodes into one) and independent nodes, b.) child, or sub-nodes (treated individually) and independent nodes, or c.) objects (of which a great many may exist for any given parent node). In embodiments, it may be possible to mix node levels according to a rule set based on defining levels for particular sets of nodes and metanodes, or on link thresholds for qualifying objects independently. Furthermore, a node with a webpage URL may often have one or more associated "feed" URLs, at which published content may be available. These feeds are generally considered as the same logical node as the parent site, but may be considered as independent nodes. If a target URL is not a publishing node, but another kind of website, the level may likewise be chosen, though more levels of hierarchy may be possible, and typically the practical choice may be between hostname level or full pathname level.

With respect to the assembly of the bipartite network matrix 132 using iterative processing of the matrix 132 to conform with chosen threshold parameters, links may be reviewed and collapsed (if necessary) to the proper node level as described hereinabove, and the two-mode network may be built between all link sources (the initial node set) and all target (second-mode) nodes at the specified node level or levels. Optionally, blacklists and whitelists may be used to, respectively, exclude or force inclusion of specific source or target nodes. From this full network data, an N×K bipartite matrix M, in which N is the set of final source nodes and K is the set of final target nodes, may be constructed according to user-specified, optional parameters, such as maxnodes, nodemin, maxlinks, linkmin, and the like. An iterative sorting algorithm may prioritize highly connected sources and widely cited targets, and then use these values to determine which nodes and targets from the full network data may be included in the matrix. Maxsources and maxtargets may set the maximum values for the number of elements in N and K. Nodemin may specify the minimum number of included targets (degree) that a source is required to link to in order to qualify for inclusion in the matrix. Linkmin similarly may specify the minimum number of included sources (degree) that must link to a target to qualify it for inclusion in the matrix. Two other optional parameters, nodemax and linkmax max be used to specify upper thresholds for source and target degree as well. Each value ($V_{ij}$) in M, is the number of individual links from source i to target j.

With respect to statistical clustering in each mode, that is node clustering 114 and outlink clustering 118, there may be a number of clustering algorithms which may be used to partition the network, including hierarchical agglomerative, divisive, k-means, spectral, and the like. They may each have merits for certain objectives. In an embodiment, one approach for producing interpretable results based on internet data may be as follows: 1) make M binary, reducing all values >0 to 1; 2) calculate distance matrices for M and its transpose, yielding an N×N matrix of distances between sources, and a K×K matrix of distances between targets. Various distance measures may be possible, but good results may be obtained by converting Pearson correlations to distances by subtracting from 1; 3) using Ward's method for hierarchical agglomerative clustering, a cluster hierarchy (tree) may be computed and stored for each distance matrix. Results of an arbitrary number of clustering operations may be saved in their entirety, so that any particular flat cluster solutions may be chosen as the basis for generating outputs.

In an embodiment, the clustering algorithm may be language agnostic, that is, forming attentive clusters around similar targets of attention without a constraint on the language of the targets. In an embodiment, clustering may make use of metadata that may enable the system to know about the content of various websites without having to understand a language. In another embodiment, the algorithm may have a translator or work in conjunction with a translation application in order to find terms across publications of any language.

Now that the first two stages of attentive clustering, network selection and two-mode network clustering, have been described we turn to a description of visualization and metrics output. Any particular set of cluster solutions for source nodes (an assignment of each node to a cluster) may be selected by the user in order to generate one or more of the following classes of output: 1.) per-cluster network metrics for source nodes 120; 2.) across clusters comparative frequency measures of link, text, semantic and other node and link-level events, content and features; 3.) visualizations 124 of the partitioned network combined with these measures and other data on node and link-level events, content and features; and 4.) aggregate cluster metrics reflecting ties among clusters taken as groups. Further, any particular set of cluster solutions for target nodes may be selected and used in combination with the set of cluster solutions for source nodes in order to generate: 1.) measures of link frequencies and densities 128 between source clusters and target clusters; 2.) visualization 124 of the previous as a network of nodes representing clusters of sources and targets with ties corresponding to link densities 128; and 3.) visualizations 124 of one-mode calculated (network of target nodes) networks with partition data.

In one class of output, and with respect to per-cluster network metrics for source nodes 120, in addition to standard network metrics for source nodes that are generated over the entire network, and which reflect various properties important for determining influence and role in information flow, user-selected cluster solutions may be used to generate a set of measures for each node, per-cluster. These measures may represent the node's direct and indirect influence on, or visibility to, each cluster, as well as its attentiveness to each cluster. For every node i, these measures may include the following: same-in: the number of nodes in the same cluster that link to i; same-out: the number of nodes in the same cluster i links to; diff-in: the number of nodes in other clusters that link to i; diff-out: the number of nodes in other clusters that i links to; same-in-ratio: the proportion of in-linking nodes from the same cluster; same-out-ratio: the proportion of in-linking nodes from other clusters; w-same-in: same-in scores where value of in-linking blogs is weighted by its centrality measure; w-diff-in: diff-in scores where value of in-linking blogs is weighted by its centrality measure; and per-cluster influence scores: similar scores (raw and weighted) for in-links from, and out-links to, each cluster on the map.

In another class of output, and with respect to across clusters comparative frequency measures of link, text, semantic and other node and link-level events, content and features, the partitioning of the network into sets of source nodes may allow independent and comparative measures to be generated for any number of items associated with source nodes. These may include such items as: a) the set of target nodes K in M; b.) any subset of all target nodes, including those on user-generated lists; c.) any set of target objects, such as all URLs for videos on YOUTUBE, or all object URLs on user-created lists; d.) any other URLs; e.) any text string found in published material from source nodes; f.) any semantic entities found in published material from source nodes; g.) any class of meta-data associated with source nodes, such as tags, location data, author demographics, and the like. For any item i in a set of items associated with source nodes, the following examples of measures may be generated per each cluster: 1) total count: number of occurrences of item within the cluster (multiple occurrences per source node counted); 2) node count: number of nodes with item occurrence within cluster (multiple occurrences per source node count as 1); 3) item/cluster frequency: total count/# of nodes in the cluster; 4) node/cluster frequency: node count/# of nodes in the cluster; 5) standardized item/cluster frequency: multiple approaches are possible, including z-scores, and one approach is to use standardized Pearson residuals, which control for both cluster size and item frequency across clusters and items in the set; and 6) standardized node/cluster frequency: multiple approaches are possible, including z-scores, and one approach is to use standardized Pearson residuals, or Cluster Focus Index scores 122. The higher the CFI score for the item, the greater the degree of its disproportionate use by the cluster. A score of zero indicates that the cluster cites the source at the same frequency as the network does on average. Other detailed data may be possible to obtain, such as the top nodes in each cluster, lists of all nodes in the cluster, lists of relevant Internet sites that each of the clusters link to (which enables identifying target outlinks where a message can be placed in order to reach specific clusters), the relative use of key terms across the clusters (which enables developing specific messages to communicate to each cluster), a hitcount (the raw number of times each outlink and term was found within all the identified nodes), source node and/or cluster geography and demographics, sentiment, and the like.

For example, differential frequency analysis can be done on meta-data, such as tags, that are associated with different attentive clusters to facilitate cluster interpretation. In the example, by sorting cluster focus scores 122 on the meta-data tags, interpretations of what the clusters are about may be derived without any manual review. The meta-data associated with the clusters may be used to facilitate interpretation of the meaning of the clusters. In an example, the meta-data may be language independent, such as GIS map data.

Figure 2:
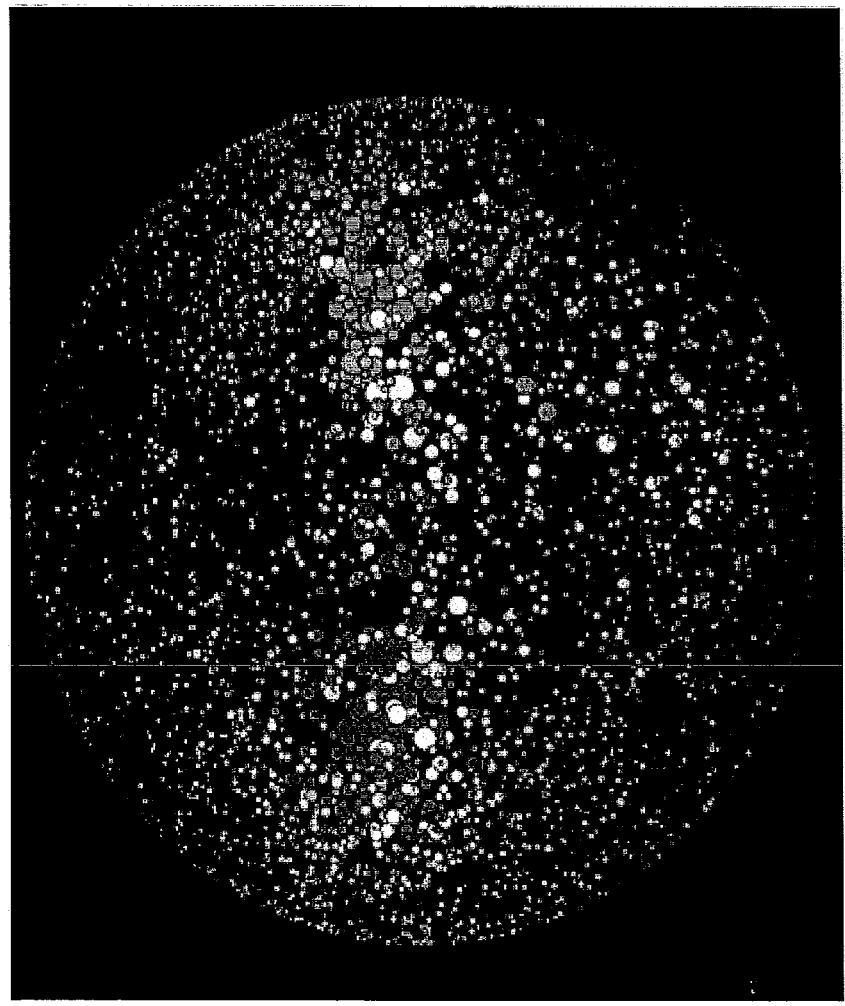
FIG. 2 depicts a social network map in the form of a proximity cluster map.

In another class of output, and with respect to visualizations of the partitioned network 124, a social network diagram may be generated and used to display link, text, semantic and other node and link-level events, content and features ("event data"), such as that shown in FIG. 2. The network map may be static or it may be the basis of an interactive interface for user interaction via software, software-as-a-service (SaaS), or the like. There may be two components to this process of visualization: 1.) creating a map of source nodes in a dimensional space for viewing; and 2.) use of colors, opacity and sizes of graphical elements to represent clusters, nodes and event data. With the dimensional mapping component, multiple approaches may be possible. One method may be to use a "physics model" or "spring embedder" algorithm suitable for plotting large network diagrams. The Fruchterman-Reingold algorithm may be used to plot nodes in two or three dimensions. In these maps, every node is represented by a dot, and its position is determined by link to, from, and among its neighbors. The size of the dot can vary according to network metrics, typically representing the chosen measures of node centrality. The technique is analogous to a locally-optimized multidimensional scaling algorithm. With the component related to use of colors, opacity and sizes of graphical elements to represent clusters and event data, nodes may be colored according to selected cluster partitions, to allow easy identification of various partitions. This projection of the cluster solution onto the dimensional map may facilitate intuitive understanding of the "social geography" of the online network. This type of visualization may be referred to as a "proximity cluster" map, because proximity of nodes to one another indicate relationships of influence and interaction. Further, projection of event data onto the map may enable powerful and immediate insight into the network context of various online events, such as the use of particular words or phrases, linking to particular sources of information, or the embedding of particular videos. This may be produced as static images, and may also be the basis of software-based interactive tools for exploring content and link behavior among network nodes.

In another class of output, and with respect to aggregate cluster metrics 128, metrics may be calculated for partitions at the aggregate level. Event metrics may include raw counts, node counts, frequencies (counts/# nodes in cluster), normalized and standardized scores, and the like. Examples typically include values such as: the proportion of blogs in a cluster using a certain phrase; the number of blogs in a cluster linking to a target website; the standardized Pearson residual (representing deviation from expected values based on chance) of the links to a target list of online videos; the per cluster "temperature" of an issue calculated from an array of weighted-value relevance markers; and the like.

As described above, any particular set of cluster solutions for target nodes may be selected and used in combination with the set of cluster solutions for source nodes in order to generate additional outputs. Visualizations produced may include: 1.) two-mode network diagram of relationships between clusters of sources and targets, treated as aggregate nodes and with tie strength corresponding to link density measures; and 2.) second-mode ("co-citation") network diagram, in which targets are nodes, connected by ties representing the number of sources citing both of them, and colors corresponding to cluster solution partitions. Another output may be macro measurement of link density. To reveal and measure large-scale patterns in the distribution of links from source nodes to targets, the matrix M may be collapsed to aggregate link measures among clusters of sources and clusters of targets. A series of S×T matrices may be used, with S as the set of source clusters ("attentive clusters") and T as the set of clustered targets ("outlink bundles"). These matrices may contain aggregated link measures, including: counts (c): the number of nodes in source cluster s linking to any member of target set t; densities (d): c divided by the product of the number of members in s and the number of members in t; and standard scores (s): standardized measures of the deviation from random chance for counts across each cell. Various standardized measures are possible, with standardized Pearson residuals obtaining good results. Any of these measures may be used as the basis of tie strength for two-mode visualizations described above.

In an embodiment, a density matrix may be constructed between attentive clusters and outlink bundles. The attentive clusters may be represented as row headers and the outlink bundles may be represented as column headers. The density matrix may allow users to see patterns in attention between certain sets of websites and certain bundles. The density matrix may provide a way to identify similar media sources. Further, the density matrix may provide information about attentive clusters that may be based on particular verticals.

Having described the process for attentive clustering, we now turn to examples of applications of the technique and various related analytical applications thereof for measuring frequencies of links between attentive clusters and outlink bundles, thus enabling identification and measurement of large-scale regularities in the distribution of attention by online authors across sources of information.

In an embodiment, and referring to FIG. 2, a social network map of the English-language blogosphere is depicted. The social network map graphically depicts the most linked-to blogs in the English language blogosphere. The size of the icons representing each individual blog may be representative of a network metric, such as the number of inbound links to the blog. This visualization depicts the output from a method for attentive clustering and analysis which identified attentive clusters of linked-to blogs, wherein the attentive clusters included authors with similar interests.

Figure 3:
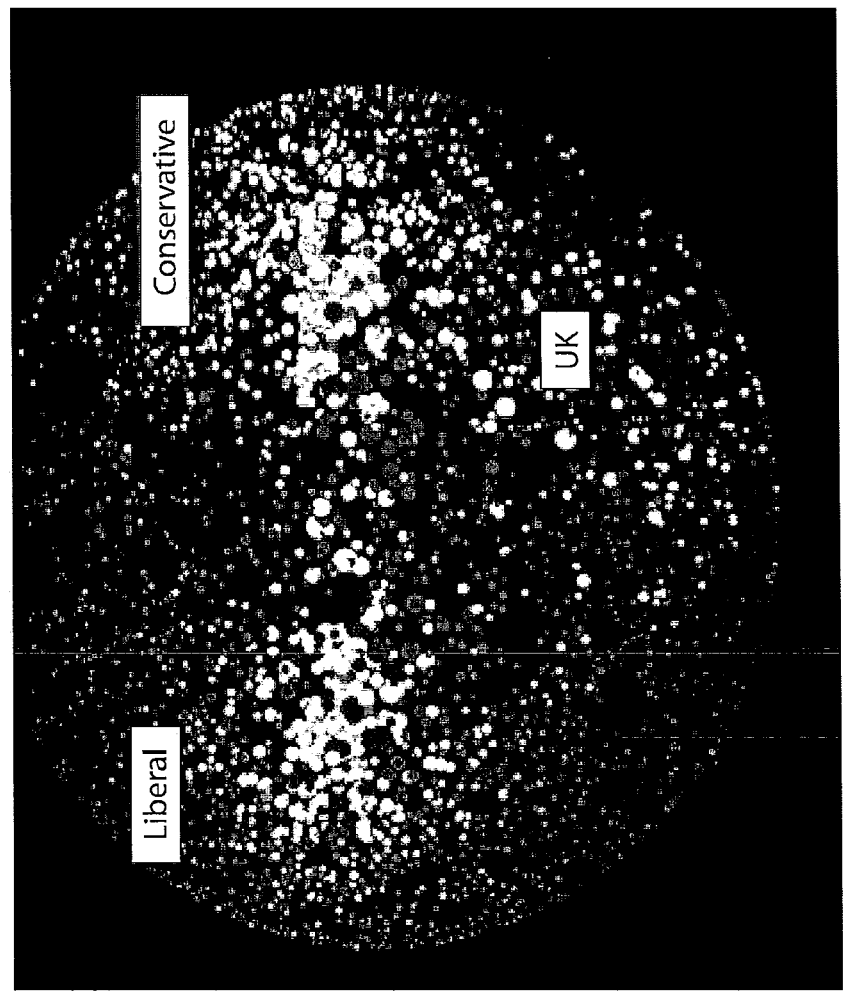
FIG. 3 depicts a social network map in the form of a proximity cluster map highlighting attentive clusters of liberal and conservative U.S. bloggers, and British bloggers.

Referring to FIG. 3, the method for attentive clustering and analysis analyzes bloggers' patterns of linking to understand their interests. The visualization in FIG. 3 highlights liberal and conservative U.S. bloggers, and British bloggers as attentive clusters. By zooming in on the visualization, subgroups such as conservatives focused on economics or liberals focused on defense may be identified from among the attentive clusters depicted.

Figure 4:
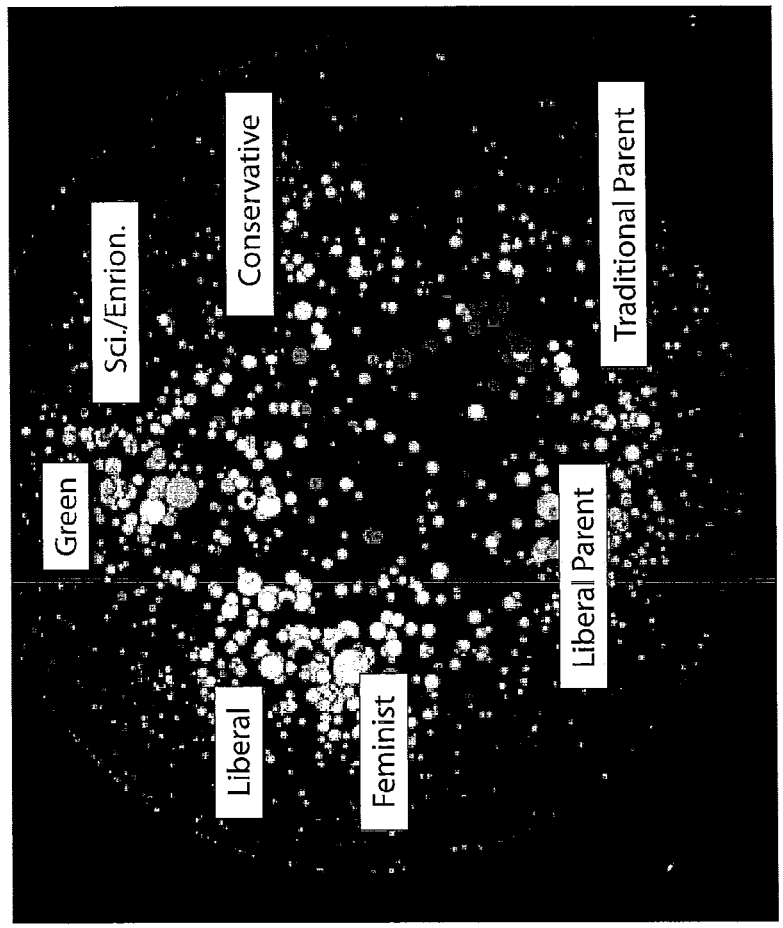
FIG. 4 depicts a social network map in the form of a proximity cluster map focused on environmentalists, feminists, political bloggers, and parents.
Figure 5:
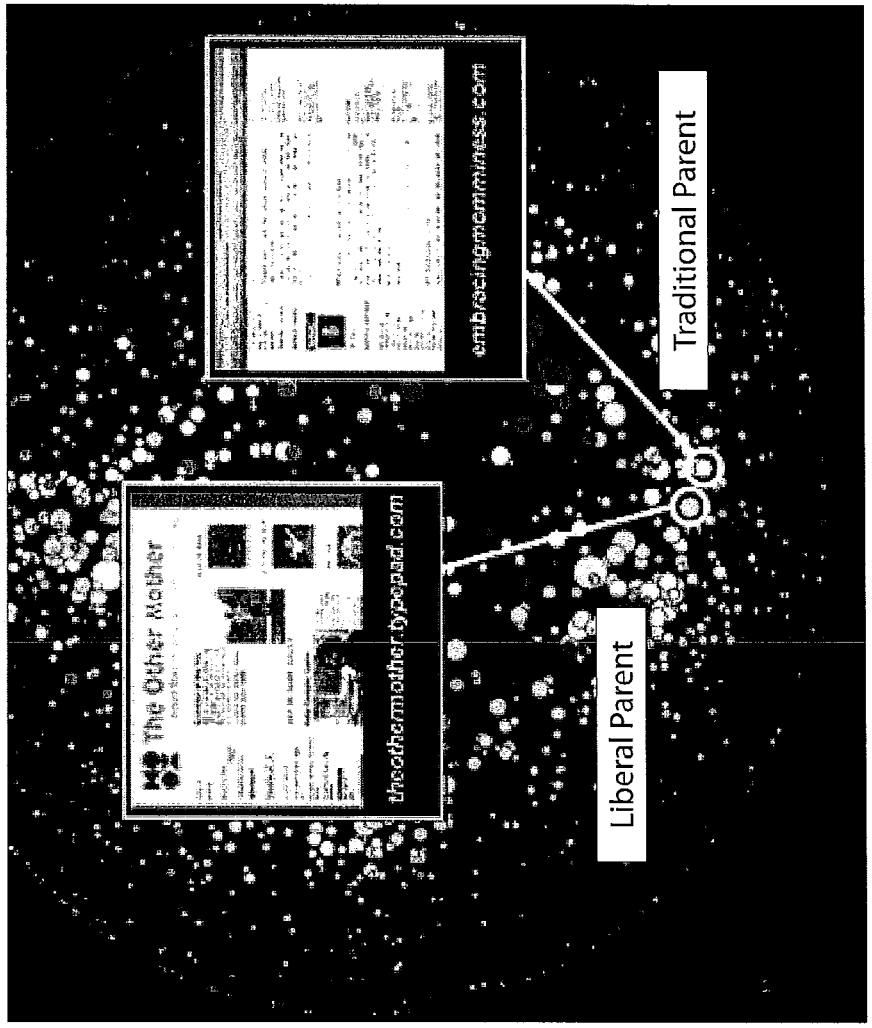
FIG. 5 depicts a social network map in the form of a proximity cluster map with a cluster relationship identified.

Referring to FIG. 4, the method for attentive clustering and analysis enables building a custom network map. In FIG. 4, the network map features attentive clusters of bloggers attuned to these topics: environmentalists, feminists, political bloggers, and parents. Subgroups within each topic may be delineated by a different color, a different icon shape, and the like. For example, within the parent bloggers, icons representing the liberal parent bloggers may be colored differently than the traditional parent bloggers. Surprising relationships may be discovered among groups of bloggers. For example, in FIG. 5, two parent bloggers with very different social values are closer in the network than either is to political bloggers who share their broader political views.

Figure 6:
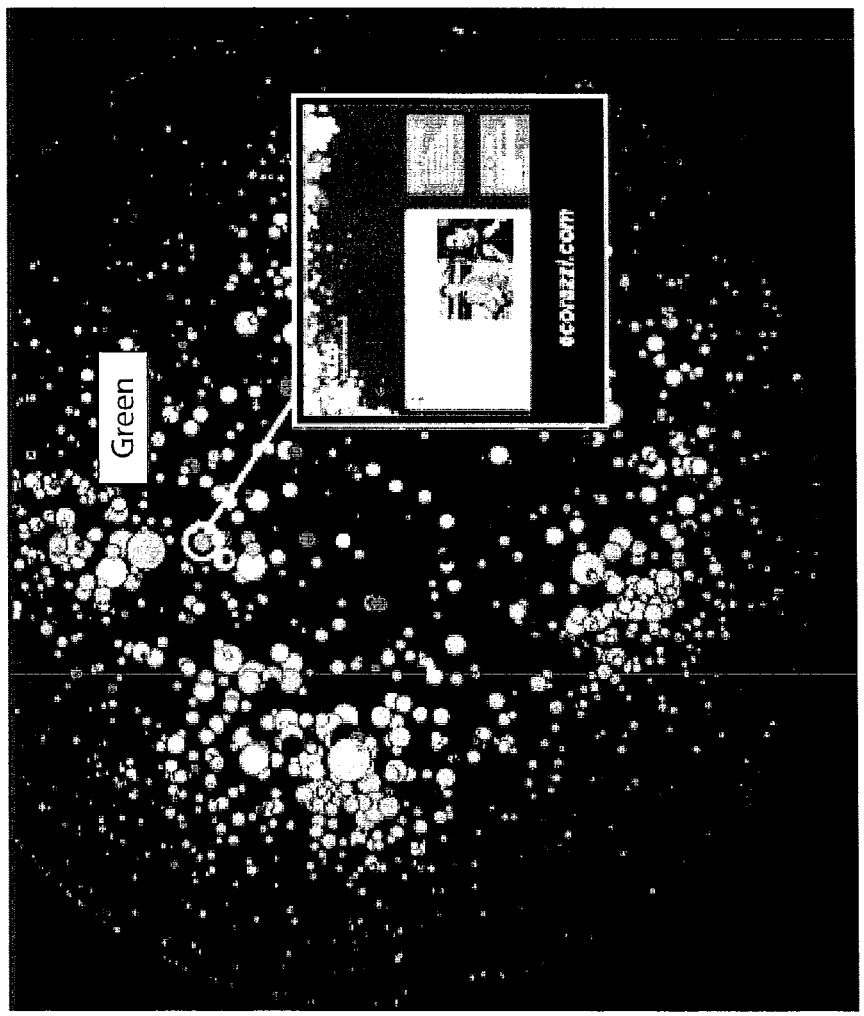
FIG. 6 depicts a social network map in the form of a proximity cluster map with a bridge blog identified.

Referring to FIG. 6, each attentive cluster may have its own core concerns, viewpoints, and opinion leaders. The method for attentive clustering and analysis enables identification of blogs that are considered bridge blogs, such as the one shown circled, which indicates that the blog is popular among multiple attentive clusters. The method for attentive clustering and analysis enables identification of whose opinions matter, about what, and among what groups.

Figure 7:
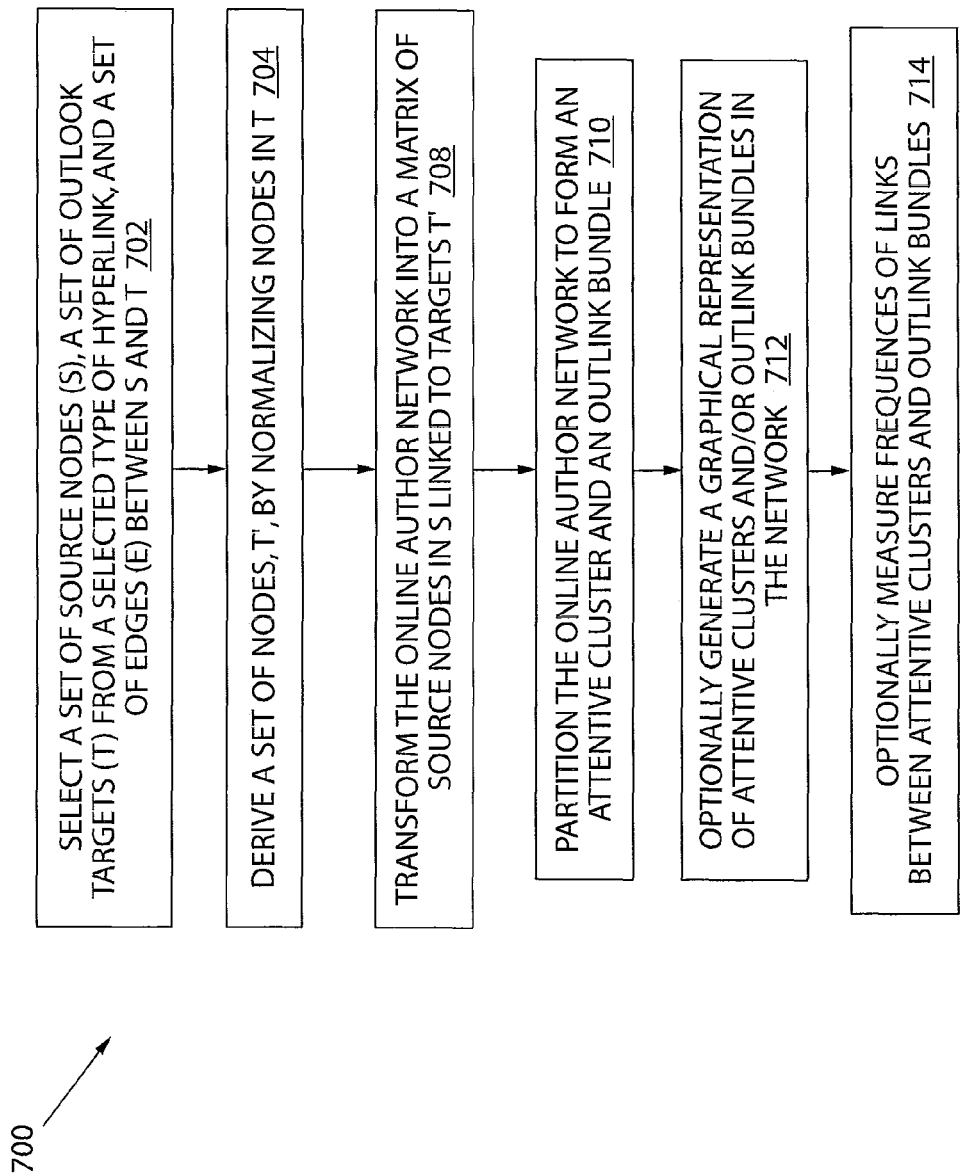
FIG. 7 depicts a flow diagram for attentive clustering.

Referring to FIG. 7, the steps of attentive clustering and analysis may include constructing an online author network, wherein constructing the online author network includes selecting a set of source nodes (S), a set of outlink targets (T) from at least one selected type of hyperlink, and a set of edges (E) between S and T defined by the at least one selected type or types of hyperlink from S to T during a specified time period 702; deriving a set of nodes, T', by any combination of a.) normalizing nodes in T, optionally to a selected level of abstraction, b.) using lists of target nodes for exclusion ("blacklists"), and c.) using lists of target nodes for inclusion ("whitelists") 704; transforming the online author network into a matrix of source nodes in S linked to targets in T' 708; and partitioning the online author network into at least one set of source nodes with a similar linking history to form an attentive cluster and at least one set of outlink targets with a similar citation profile to form an outlink bundle 710. The steps may optionally include generating a graphical representation of attentive clusters and/or outlink bundles in the network to enable interpretation of network features and behavior and calculation of comparative statistical measures across the attentive clusters and outlink bundles 712, wherein at least one element of the graphical representation depicts a measure of an extent of a type of activity within the network; and optionally measuring frequencies of links between attentive clusters and outlink bundles enabling identification and measurement of large-scale regularities in the distribution of attention by online authors across sources of information 714. The element of the graphical representation may use at least one of size, thickness, color and pattern to depict a type of activity. Attentive clusters may be visually differentiated in the graphical representation by at least one of a color, a shape, a shading, and a size. The size of the object representing the attentive clusters in the graphical representation may correlate with a metric. The nodes, targets, and edges may be collected from public and private sources of information.

Constructing the matrix may include applying at least one threshold parameter from the group consisting of: maxnodes, targetmax, nodemin, targetmin, maxlinks, and linkmin. Constructing the matrix may include applying a minimum threshold for the number of included nodes that must link to a target to qualify it for inclusion in the matrix. Constructing the matrix may include applying a minimum threshold for the number of included targets that must link to a node to qualify it for inclusion in the matrix. Constructing the matrix may include using blacklists to exclude particular nodes, and whitelists to force inclusion of particular nodes. The matrix may be a graph matrix.

By identifying and measuring the frequencies of links between attentive clusters and outlink bundles, all manner of information about the distribution of attention by online authors across sources of information may be obtained. Various examples of the sorts of information, visualizations, applications, reports, APIs, widgets, tools, and the like that are possible using the methods described herein will be described. For example, two playlists for YouTube videos may be identified, one that has traction with sub-cluster A the other with sub-cluster B. In another example, two RSS feeds may be organized that supply a user with items that have more attention from sub-cluster A versus sub-cluster B. In another example, a valence graph may be constructed that depicts words, phrases, links, objects, and the like that are preferred by one sub-cluster over another sub-cluster; such valence graphs may use aggregated sets of clusters defined by users to display dimensions of substantive interest, such as in FIG. 11. In yet another example, works from authors who are most relevant in a particular cluster may be displayed and then published as a widget, which may be custom-based on a valence graph, as a way of monitoring an ongoing stream of information from that cluster. Further examples will be described hereinbelow.

A user may be able to, optionally in real time through a user interface, select a stream of information based on looking at the environment, zoom in based on clustering, figure out a valid emergent segmentation, and then set up monitors to watch the flow of events, such as media objects, text, key words/language, and the like, in real time.

In an embodiment, differences in word frequency use by attentive clusters may be used to differentiate and segment clusters. For example, the attentive clusters 'militant feminism' and 'feminist mom' may both frequently use terms associated with feminism in their publications, but additional use of terms related to militantism in one case and maternity in another case may have been used to subdivide a cluster of feminists into the two attentive clusters 'militant feminism' and 'feminist mom'. In extending this concept, not just word usage but the frequency of word usage, may also be useful in segmenting clusters. For example, in clusters of parents, the ones actually doing home schooling did not use the term 'home school' frequently, but rather used the term 'home education' with greater frequency. By identifying the specific language/words used by a cluster, the system may enable crafting messages, brands, language, and the like for particular clusters. In an embodiment, an application may automatically craft an advertisement to be placed at one or more outlinks in an outlink bundle using high frequency terms used by an attentive cluster. Further in the embodiment, the advertisement may be automatically sent to the appropriate ad space vendor for placement at the one or more outlinks.

In an embodiment, a method of using attentive clustering based on analysis of link structures to steer a further data collection process is provided. The data collection may include collection of web-based data, such as for example, clickstream data, data about websites, photos, emails, tweets, blogs, phone calls, online shopping behavior, and the like. For example, tags may be collected automatically or manually for every website that is a node. The tags may be non-hierarchical keywords or terms. These tags may help describe an item and may also allow the item to be found again by browsing or searching. In an example, tags may be associated in third-party collections such as DELICIOUS tags, and the like. In another example, there web crawlers may extract meta keywords and tags included within node html. Further, specific keywords and phrases may be exported to a database. In yet another example, the tags may be generated by human coders. Once a cluster partitioning exists, the system may do differential frequency analysis on the tags that are associated with different attention clusters. By sorting cluster focus index (CFI) scores along with the tags, the system can come up with an interpretation of the meaning of a cluster without requiring further analysis of the cluster itself. In an embodiment, the system may apply a further data collection process in order to associate respondents to a survey and their news sources with various corners of the internet landscape. For example, the influence of a particular news outlet across a segmented environment of the online network may be obtained by examining clustering in conjunction with a downstream data collection process, such as obtaining survey research, clickstream data, extraction of textual features for content analysis including automated sentiment analysis, content coding of a sample of nodes or messages, or other data.

In an embodiment, clustering data may be overlayed on GIS maps, "human terrain" maps, asset data on a terrain, cyberterrain, and the like.

In an embodiment of the present invention, a method of determining a probability that a user will be exposed to a media source given a known media source exposure is provided. The media source may include newspapers, magazines, radio stations, television stations, and the like. For example, a user who may be exposed to a particular media source may be clustered in a specific attentive cluster. Accordingly, the system may determine that users in that particular attentive cluster are more likely to be exposed to another media source because the second media source may also be present in an outlink bundle preferred by the cluster.

In an embodiment of the present invention, a method of attentive clustering on a meso level is provided. The method may enable identifying emergent audiences (Attentive Clusters) and monitor how messages (as specific as a single article in print; as broad as core campaign themes) traverse cyberspace. The method may involve mapping the attentive clusters where messages have, or are likely to find, receptive audiences. Mapping may enable identifying opinion leaders, and information sources, online and offline, which help shape their views.

The method may enable identification of the mindset/social trends of a group of users. For example, the system may be able to associate an attentive cluster with a known network, such as a political party, a political movement, a group of activists, people organizing demonstrations, people planning protests, and the like. Via the ability to associate attentive clusters with particular groups of people, the system may be able to track the evolution of a movement or identity over time. Further, if a cluster supports a political movement, the system may track the impact of the political movement of the cluster on society. The system may track if the political movement has been accepted by majority of the people of the society, rejected by the society, if there is debate about the political movement, and the like. Accordingly, the method may enable growth of a brand, sale of a product, conveying a message, prediction of what people care about or do, and the like.

In an embodiment of the present invention, a system and method for multi-layer attentive clustering may be provided. In the system and method, attentive clusters may be tracked across various layers of a social segmentation, such as specific social media networks (Twitter™, Facebook™, Orkut™, and the like), a blogosphere, and the like. The system may be able to track development of an attentive cluster in a single layer or across multiple layers at every stage of the development of the cluster. When different layers of online media (such as weblogs, microblogs, and a social network service) are clustered individually, measures of association may be created between clusters across layers, based on density of hyperlinks between them, common identities of underlying authors, mutual citation of the same sources, mutual preference for certain topics or language, and the like. The system may also track the major players of clusters at every stage of development of the cluster.

For example, the growth of an attentive cluster supporting a political movement may be tracked back in time and over a period of a time. In the example, once an attentive cluster may be identified, the system may examine the nodes associated with specific players in the attentive cluster in order to determine characteristics, such as who is talking to whom, identify key nodes or hubs that link many other layers and/or media sources, identify apparent patterns of affinity or antagonism among clusters or other known networks, who may have started the political movement, when the political movement may have started, what messages were used at the forefront of the political movement's establishment, the size of the movement, the number of people who initially joined the political movement, growth of the political movement, influential people from various stages of the political movement, and the like. In this example, all of the analysis may be confined to activity in a single layer of a social segmentation or it may be undertaken across multiple layers. Continuing with the example, the impact of the political movement on society may be examined by tracking the penetration of an attentive cluster or its message across layers or the expansion of the attentive cluster in a single layer. Likewise, attentive cluster analysis may enable predictions. For example, an attentive cluster may be tracked in a single layer, such as by monitoring the number of Twitter followers, the frequency of new followers added, the content associated with that attentive cluster, intercluster associations, and the like, to determine if a political movement may be being spawned, expanded, diminished, or the like. In an embodiment, the socio-ideological configuration of the people who spawned the political movement may be evident from analyzing one or more of a blog layer, a social networking layer, a traditional media layer, and the like.

In an embodiment, the system may be deployed on a social networking site to identify and track attentive clusters and linkage patterns associated with the attentive clusters. For example, the system for attentive clustering may be applied on Facebook™ to identify attentive clusters in the Facebook™ audience and track the cluster's activity within Facebook™. In an example, the system may be used to identify a group of people who may be susceptible to a message. By identifying and tracking an attentive cluster in the Facebook™ layer that may be susceptible to a message, downstream activities, such as organizing in response to the message, may be examined. For example, an attentive cluster of university students may be presented with a message regarding a proposed law lowering the drinking age. The system may track activity within the cluster related to the message, identify new groups formed around the topic of the message, invitations to other groups regarding the message, opposition from other groups in response to the message, and the like. Indeed, the system may be able to track the formation of new attentive clusters in the Facebook™ layer in response to the message. In this case, the system may identify individuals or groups that link to one another who share a common interest or target of attention, such as concerned parents opposing the proposed law, anti-government groups supporting the proposed law, child advocate groups opposing the law, and the like. Discoveries related to the original layer may be applied to strongly associated clusters in other layers. For instance, determination about the interests of a cluster in the Facebook™ layer may be used to drive a communications or advertising strategy in associated clusters of other layers such as weblogs or Twitter™.

In an embodiment of the present invention, a method of analyzing attentive clusters over time is provided. The analysis of these attentive clusters may enable the system to depict changes in the linking patterns of attentive clusters over a time period. Further, the analysis may allow depiction of any changes in the structure of the network itself.

In an embodiment, a time-based reporting method may be used by the system to demonstrate the effects of events/actions throughout a network of attentive clusters for a period of time. In the method, bundles that may be lists of semantic markers, including text elements embedded in a post or tweet, links to pieces of online content, metadata tags, and the like, may be tracked in clusters across a network, such as a blogosphere.

For example, a bundle of semantic markers related to obesity may be tracked over time to determine how the topic of obesity is being discussed. In the example, a particular bundle (with text, link and meta data elements) can be tracked across clusters to see where they are getting attention or not. The measure of attention may be defined as a 'temperature'. The 'temperature' is based conceptually on Fahrenheit temperatures (without negatives) as compared to other issues where 100 is very hot and 0 is ice cold. The method may have a tracking report as an output for tracking issues in a map across time. In this example, the tracking report may be focused on a collection of blogs most focused on childhood obesity organized into attentive clusters over a moving 12-month period of time. The blogs may be clustered broadly into policy/politics, issue focus, culture, family/parenting, and food attentive clusters. There may be sub-clusters defined for each of those clusters, such as conservative, social conservative, and liberal sub-clusters under the policy/politics cluster. The report may indicate the issue intensity for each cluster/sub-cluster by assigning it an average temperature per blog of conversation on the broad topic of childhood obesity within each group. The report may indicate the issue distribution for each cluster/sub-cluster by calculating a percentage of childhood obesity conversations taking place on blogs not in the map and within each cluster within the map. Continuing with this example, specific terms may be tracked across the clusters/sub-clusters over time and the method may indicate an average temperature based on the uses of specific terms in blogs within each cluster. In the example, the term 'school lunch' has a high 'temperature' in certain issue focus clusters, liberal policy clusters, and foodie clusters and steadily increased over the last eight moving 12-month periods. Similarly, the intensity of sites, or the average temperature based on links to specific web sites on blogs within each cluster, may be provided by the report. The intensity of source objects, or the average temperature based on the links to specific web content (articles, videos, etc.), may be provided by the report. The intensity of sub-issues, or the average temperature of conversation on identified issues defined by a set of terms and links, may be provided by the report. In the report, specific terms may be tracked on a monthly and per-cluster basis, specific sites may be tracked on a monthly and per-cluster basis, and specific objects may be tracked on a monthly and per-cluster basis.

In an exemplary embodiment, the system may identify and track structural changes in a network. For example, during the recent US elections, blogs appeared instantaneously that were anti-Obama, Pro-Palin, or Pro-McCain but were outside the conservative blogosphere. This rapid change in the network structure may be indicative of a coordinated, synchronized campaign to message and blog.

In an embodiment of the present invention, a method of attentive clustering by partitioning an author network into a set of source nodes with similar adoption and use of technology features is provided. For example, instead of a website being a target of attention for an attentive cluster or around which an attentive cluster forms, a feature or a piece of technology, such as an embedded Facebook 'Like' button, may be a target of attention or clustering item.

In an embodiment, a method of creating clusters of people and describing probabilistic relationships with other clusters, such as words, brands, people, and the like, is provided. The system may describe any probability of any relation between them.

Figure 9:
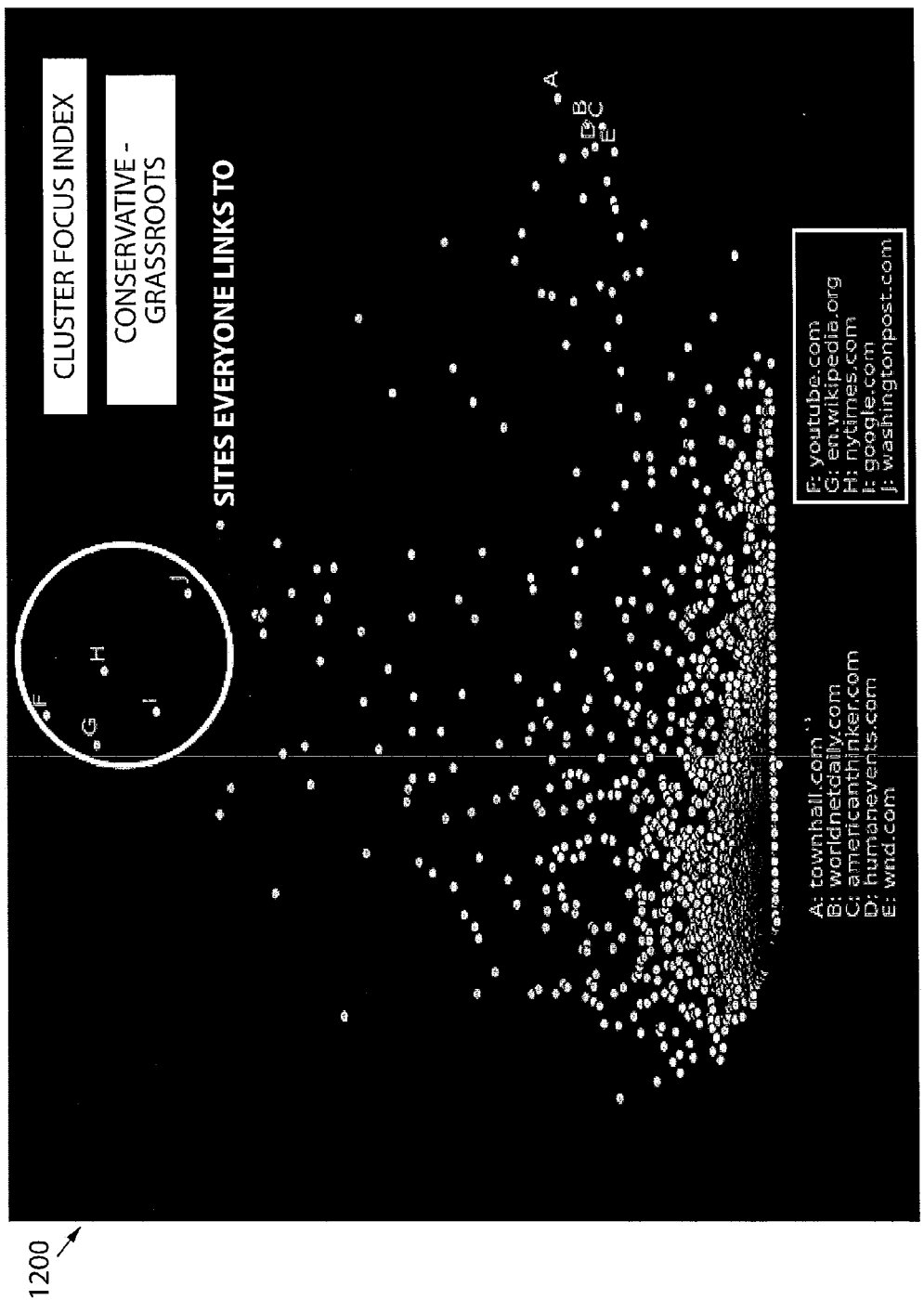
FIG. 9 depicts a graph of CFI scores.
Figure 10:
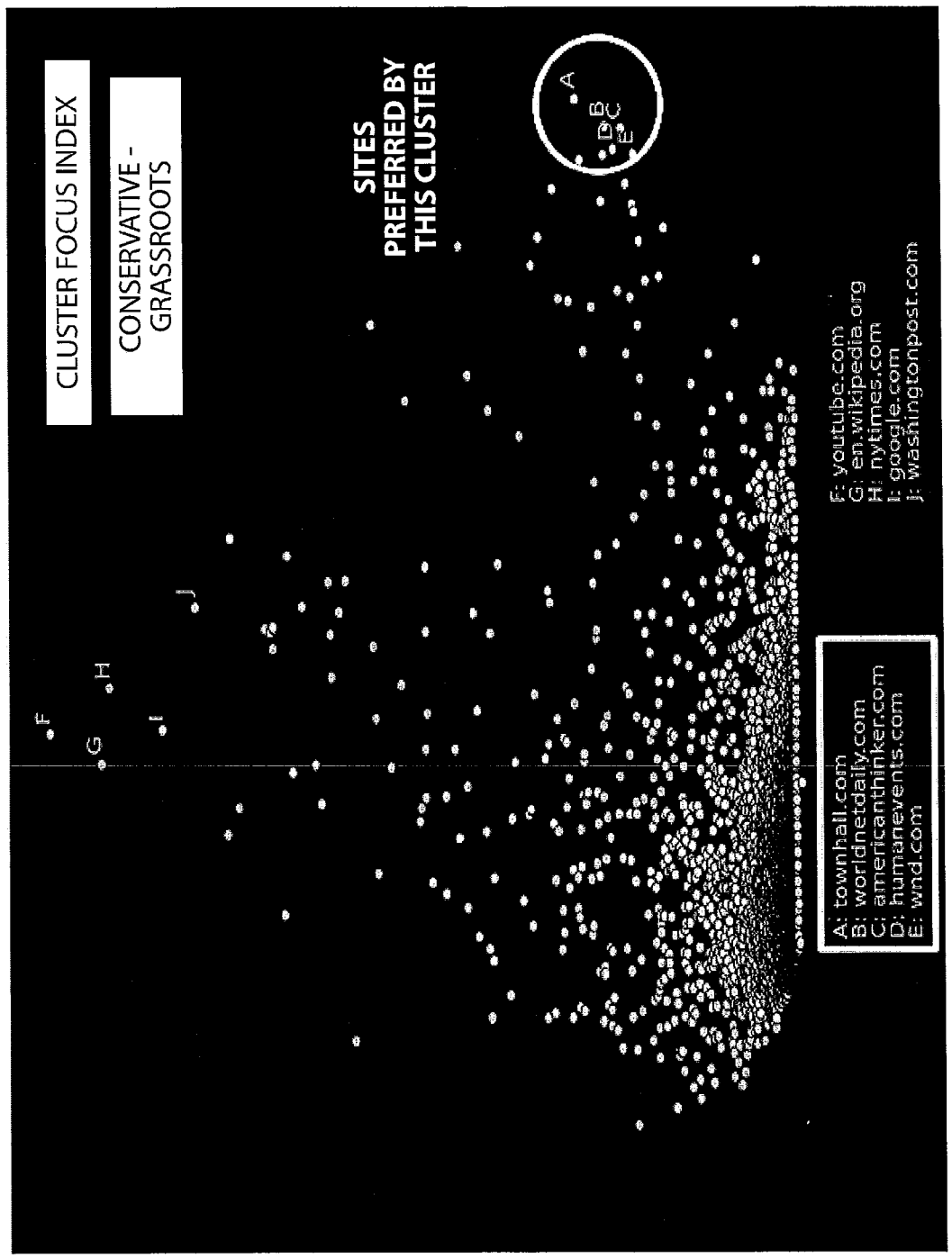
FIG. 10 depicts a graph of CFI scores.

To identify what an attentive cluster links to more than the network average or what words and phrases they use more than the network average, a cluster focus index score (CFI) may be calculated. CFI represents the degree to which an event, characteristic or behavior disproportionately occurs in a particular cluster, or a particular cluster, relative to the network, preferentially manifests an event, characteristic or behavior. For example, CFI score could be generated for a particular cluster across a set of target nodes, representing the degree to which a particular target is disproportionately and preferentially cited by members of the particular cluster, or the degree to which the particular cluster, relative to the network, preferentially cites the target. The CFI gives a sense of what is important to an attentive cluster, where they go for their information, what words, phrases and issues they discuss, and the like. FIG. 9 depicts a graph of cluster focus index scores for targets of a conservative-grassroots attentive cluster. The targets circled on FIG. 9 (F through J) are those that everyone in the network links to, according to their CFI. The targets circled in FIG. 10 (A through E) are those that are disproportionately linked to by the conservative-grassroots attentive cluster, according to their CFI.

In an embodiment, a method of identifying websites with high attention from an identified attentive cluster or author is provided. The method may include determining the websites frequently or preferentially cited by identified authors by examining the websites' cluster focus index (CFI) score. Further, the method may include automatically sending or placing advertisements, alerts, notifications, and the like to the websites. For example, a social network analysis may generate a network map with thousands of nodes clustered into attentive clusters. In an example with bloggers, influence data that results from the network analysis may be influence metrics for sites from across the Internet which bloggers link to, including mainstream media, niche media, Web 2.0, other bloggers, and the like. These are the influential sources (also called outlinks, or targets) used by specific groups of nodes across the map. For example, influencing a targeted cluster of bloggers can often be accomplished by targeting these sources, "upstream" in the information cycle, rather than going after the bloggers directly. In other embodiments, influence data may be metrics that reveal network influence among bloggers directly. Bloggers are usually thought of as simply being more influential or less, but this data lets the analyst discover which blogs are influential among which online clusters (segments), a far more granular and targeted approach. Each of these data sets can be sorted to examine either influence over the entire map or disproportionate influence over particular clusters (i.e.—how to reach particular audiences). Cluster targeting can be further refined to identify which nodes in a specific cluster have influence on any of the other clusters on the map. Because the conversation within social media covers a wide variety of topics, source and network influence alone do not necessarily reflect influence on a specific topic. A relevance index metric for discussion regarding particular topics, events, and the like may be added to a social network analysis to identify which nodes are most focused on this topic.

For both data sets there are two main sorts metrics representing influence. First are metrics representing the influence of nodes in the one-mode network (set of source nodes S) as a whole, or directly among particular clusters or among specific other nodes. For example, for any given node in S, count (also called in-degree) is the number of other nodes in S that link to it. Count can be calculated across the whole map, or per cluster. Second, score can be calculated that show the influence of target nodes (nodes in T or T') on clusters of nodes in S. Count can also be used, and CFI scores can be calculated that represent the influence of particular targets on specific attentive clusters. In other words, how specifically interesting or authoritative the target is for that cluster. Relevance index scores may for nodes may also be calculated using lists of semantic markers, to provide further metrics of value for targeting communications, advertising, and the like. Depending on the communications strategy, specific sorts of the data will create lists of likely high-value targets for further action. While count, CFI, and relevance index scores are all important, they can be combined in order to maximize certain objectives. The following use case examples include combining count and relevance into a targeting index, by multiplying their values. Other, more complicated maximization formulas are possible as well. The examples demonstrate specific influence sorts that can be generated from the Russian network data to address each use case. The network data is based on the linking patterns of the nodes in the RuNet map over a nine-month period ending in February 2010.

Use Case 1 and Use Case 2 involve finding influential sources. Use Case 1 involves identifying sources with the most influence over the entire map by doing a sort using the highest values of count. While extremely influential, and in many cases suitable for advertising campaigns, these universally salient sites also tend to be much harder to reach out to than sites that are smaller but specifically important to targeted segments.

Use Case 2 involves identifying sources that reach a targeted cluster by sorting on sources by Cluster Focus Index. CFIs may be sorted for any of the attentive clusters. Count metrics from the map as a whole and from the targeted cluster can be used to further prioritize for action. This sort is the equivalent of identifying traditional media trade press, the go-to sites for the selected segment. Frequently, these include specifically influential bloggers in addition to niche media and other sources.

Use Cases 3-6 involve finding influential nodes. Use Case 3 involves identifying the greatest network influence by sorting the nodes by indeg (total number of links from other nodes within the entire network). This sort specifically identifies the network's "A-list" nodes, the most influential network members (bloggers). Like prominent sources, these are often more difficult to reach than more targeted niche influentials, but they contribute greatly to spreading viral niche messages across the wider network.

Use Case 4 involves finding the most targeted influencers for a particular cluster by sorting the Cluster Focus Index scores for a targeted cluster to find nodes with cluster-specific influence. This identifies the nodes with particular influence, interest or prestige among the target cluster. These nodes tend to be much more "on topic" than others, and much easier to reach that map-wide A-list nodes. Cluster-specific influentials are not always from the target cluster itself, which can be very useful for trying to move discussion between particular clusters. Link metrics provide further assistance in deciding targeting priorities.

Use Case 5 involves following a particular topic at the map level by sorting using topic focus target scores, which combine links (network influence) and topic focus index (issue relevance). Formulas for calculating focus target score can be varied, but the default may be to multiply links by topic focus index. This may allow identification of those nodes in the entire map that discuss the target issue most frequently. These may be monitored to gauge dominant threads of discussion and opinion about the issue, and targeted for outreach.

Use Case 6 involves targeting a particular cluster's conversation on a topic by sorting within a cluster by the topic focus target score. This may allow members of the target cluster who write about the target issue to be identified for monitoring or persuasion. Variations of the formula for combining influence and relevance metrics into a single targeting metric can be used to bias the sort toward relevance, or toward influence, depending on strategic objective.

In an embodiment, a proximity cluster map method may be used to visualize 124 attentive cluster-based data and generate a network map. In the method, attentive clusters and heir constituent nodes may be displayed in a proximity cluster map. Nodes in the network map may be represented by individual dots, optionally represented by different colors, whose size is determined based on the number of other nodes on the map link to them. A general force may act to move dots toward the circular border of the map, while a specific force pulls together every pair of nodes connected by a link. In static images or an interactive visualization via software connected to a database, nodes may receive a visual treatment to display additional data of interest. For example, dots representing nodes may be lit or highlighted to represent all nodes linking to a particular target, or using a particular word, with other nodes darkened. In another example dot size may be varied to indicate a selected node metric.

Figure 8:
FIG. 8 depicts a Political Video Barometer valence graph.

In an embodiment, a valence graph method may be used to visualize 124 attentive cluster-based data and generate a valence graph. In the method, targets of attention or semantic elements occurring in the output of nodes may be displayed in a valence graph. The valence graph method may be understood via description of how a particular valence graph is built, such as a Political Video Barometer valence graph (FIG. 8) useful for discovering what videos liberal and conservative bloggers are writing about. This particular valence graph may be used to watch and track videos linked-to by bloggers who share a user's political opinions, view clips popular with the user's political "enemies", and the like.

The videos shown in the Barometer are chosen by queries against a large database built by network analysis engines performing network selection 102. Periodically, a crawler (or "spider") visits millions of blogs and collects their contents and links Next, the system mines the links in these blogs to perform partitioning 104 and forms attentive clusters based on how the blogs link to one-another (primarily via their blog rolls), and, over time, what else the bloggers link to in common. Attentive clusters may be large or small, and the bigger ones can contain many sub-clusters and even sub-sub-clusters. In embodiments, determining what the blogs have in common may be done by examining meta-data, tags, language analysis, link target patterns, contextual understanding technology, or by human examination of the blogs or a subset thereof. In the example, American liberal bloggers and American conservative bloggers form the two largest sets of clusters in the English language blogosphere, and the Barometer draws upon roughly the 8,000 "most linked-to" blogs in each of these groups to position the videos on the graph by calculating proportions of links to each target by the two political cluster groupings.

The Barometer may be continually updated by scanning the blogs periodically, looking for new links to videos (or videos embedded right in the blogs). By counting these links, it can be determined what videos political bloggers are promoting. In embodiments, the link count may be displayed on the valence graph using an identifier such as icon or marker. In this example, some videos are linked to almost exclusively by liberal bloggers, some are linked to mostly by conservative bloggers, and a few are linked to more or less evenly by both groups. Once the system determines that a video has traction in the political clusters, it scans through data from other parts of the blogosphere to count how many "non-political" bloggers link to it as well.

The Political Video Barometer example illustrates one kind of valence graph and the insight that can be gained and the applications that can be built based on the method and the data obtained by the method. It should be understood that the method may be used to examine any sort of potentially cluster-able data, such as technology, celebrity gossip, the use of linguistic elements, the identification of new sub-clusters of particular interest, and the like. All aspects of the valence graph method, and the underlying attentive clustering analysis, may be customized along multiple variables to enable planning and monitoring campaigns of all kinds.

In an embodiment, a multi-cluster focus comparison method may enable comparing cluster focus index (CFI) scores of multiple attentive clusters. The CFI score may be a measure of the degree to which a particular outlink is of disproportionate interest to the attentive cluster being analyzed, in other words, the CFI indicates what link targets are of specific interest to a particular cluster beyond their general interest to the network as a whole. In an example, X may be the CFI score for cluster A and Y may be the CFI score for cluster B. The multi-cluster focus comparison method may compare the two clusters, A and B, based on their CFI scores, X and Y. This would allow a user to discern elements of common interest vs. divergent interest between the two clusters. Insights derived from this method would be of great value in creating and targeting advertising and communications campaigns.

Figure 11:
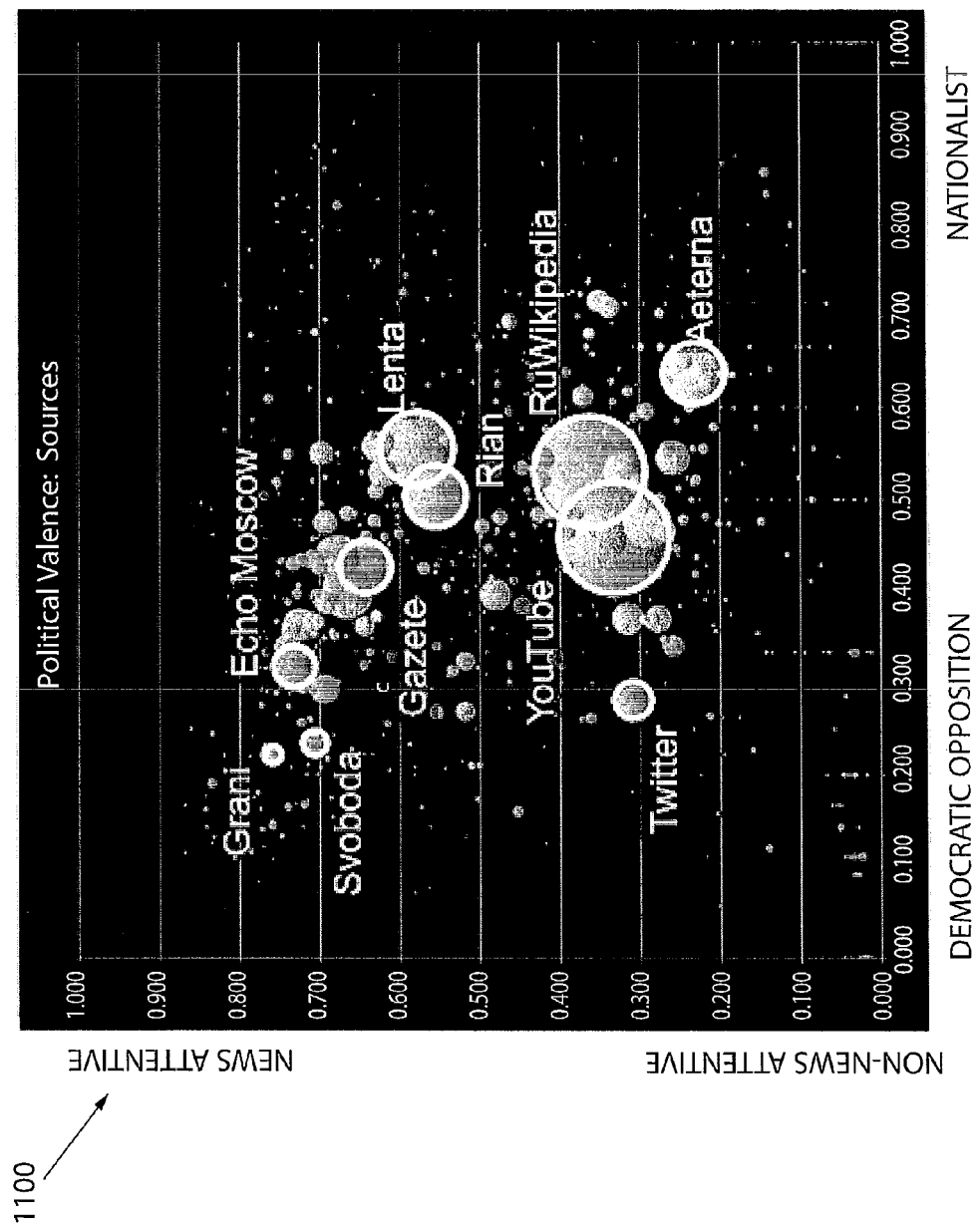
FIG. 11 depicts a bi-polar valence graph of link targets in the Russian blogosphere.
Figure 13:
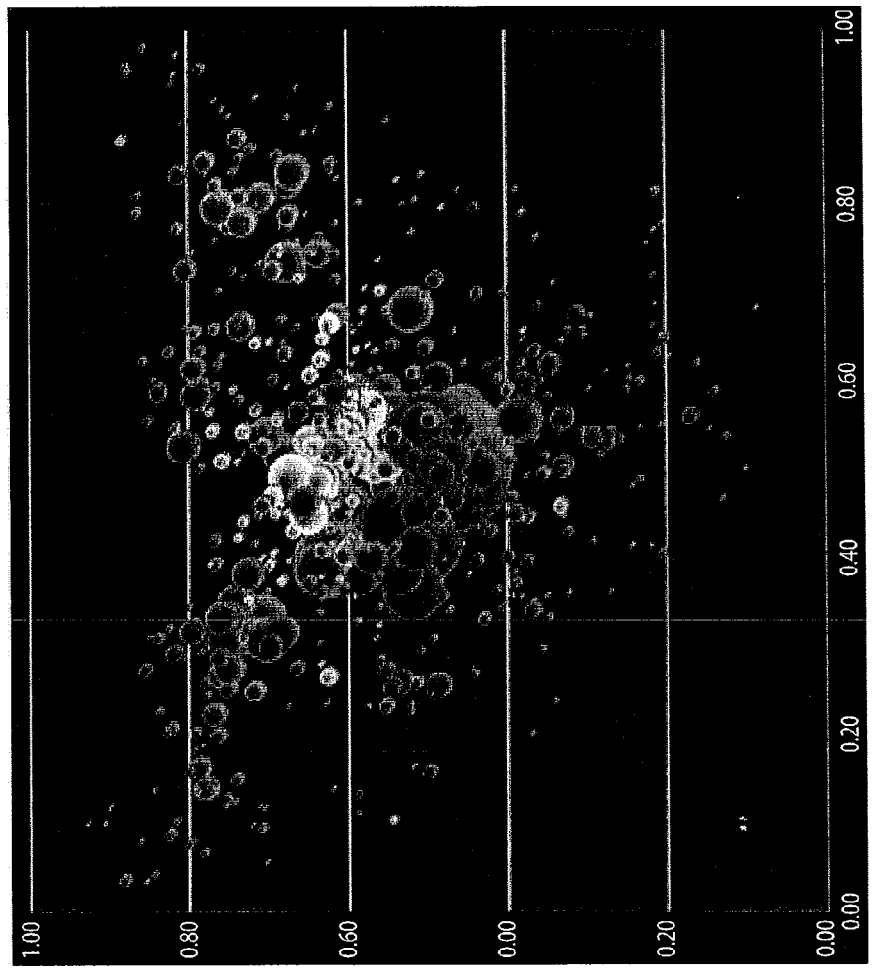
FIG. 13 depicts a valence graph of outlink targets organized by proportion of links from liberal vs. conservative bloggers.

In another embodiment, link targets, semantic events, and node-associated metadata may be scattered in an x-y coordinate space, and the dimensions of the graph may be custom-defined using sets of clusters grouped to represent substantive dimensions of interest for a particular analysis. Elements are plotted on X and Y according to the proportions of links from defined cluster groupings. For example, and referring to FIG. 11, using data from the Russian blogosphere, the top 2000 link targets for Russian bloggers may be plotted such that the proportion of links from "news-attentive" blog clusters vs. links from "non-news attentive" clusters determined the position on Y, while the proportion of links from the "Democratic Opposition" cluster vs. the "Nationalist" cluster determines the position on X, as shown in FIG. 11. In another example, popular outlink targets for the US blogosphere may be displayed with the X dimension representing the proportion Liberal vs. Conservative bloggers linking to them, and the proportion of political bloggers of any type vs. non-political bloggers represented by the Y dimension, as shown in FIG. 13. Various data may be visualized in the graph associated with the clusters of news-attentive and political bloggers, such as meta-data tags, words, links, tweets, words that occur within 10 words of a target word, and the like. These visualizations may be used in interactive software allowing user-driven exploration of the data graphed in valence space, optionally allowing user-defined sets of clusters to be used in calculating valence metrics.

In an embodiment, a method of node selection 110 based on node relevance to a defined issue, also known as semantic slicing, is provided. Semantic slicing may involve clustering according to a relevance bundle. A relevance bundle may include one or more of key markers, what the nodes may have linked to, what the nodes have posted, text elements, links, tags, and the like. In essence, semantic slicing involves pre-screened nodes for relevance based on semantic analysis.

The relevance bundles may be used to sort through all of the network data to select the top high relevance nodes. In an embodiment, a custom-mapping of a sub-set of the link economy may be done.

In an embodiment, semantic slicing may enable generating a contextualized report of interest to a user on an industry level. Semantic slicing may enable focusing attentive clustering on selected vertical markets. The vertical markets may be a group of similar businesses and customers who may engage in trade based on specific and specialized needs. Lists of semantic markers, such as key words and phrases, links to relevant websites and online content, and relevant metadata tags, are built which represent the relevant vertical market. Relevance metrics are calculated for candidate nodes, and a selection of high-relevance nodes are mapped and clustered. Continuing the example, the semantic slice may be done to analyze an energy policy vertical market by focusing the attentive clustering around one or more selected, highly relevant nodes. Thus, the attentive clusters may be more specific to identified domain interest of interest or vertical market. In this example, instead of just forming an attentive cluster of Conservative bloggers, by focusing attentive clustering on one or more key markers related to energy policy, the attentive clusters discovered include topic-relevant segmentations of particular kinds of Conservative bloggers discussing the issue, such as Conservative-Grassroots and Conservative-Beltway. Additional high-relevance attentive clusters may be identified, such as Climate Skeptics, Middle East policy, and the like. Cluster focus index scores may be used to determine what sites everyone in each cluster links to and which sites are preferred by the cluster. In an embodiment, semantic slicing may be done using a single node, such as a particular website, a particular piece of content, and the like. In an embodiment, semantic slicing may be done over a period of time to enable monitoring the impact of a campaign.

In an embodiment, a tool, such as software-as-a-service, for enabling users to define one or more semantic bundles for attentive clustering and as the basis of report outputs is provided. The tool may be an on-demand tool that may be used for semantic slicing. In such models, a user may declare a semantic bundle of nodes and/or links prior to attentive clustering.

In an embodiment, the system may provide an application programming interface (API) for delivering a segmentation to track one or more particular clusters of attention, or track how an audience is interacting with a piece of content, and the like. The data about the various clusters may be collected directly from the API. For example, a user may wish to track a cluster. The user may enter keywords related to the cluster in a search option provided by the API. Thereafter, the tool may track various websites and report back the weblinks and data that may be relevant to the cluster. The API may be used to interact with a valence graph at various resolutions. The API may provide segmentation data and metadata derived from the segmentation to other analytics and web data tracking firms, for use in their own client-facing tools and products. The segmentation and resultant data from attentive clustering provide an additional dimension of high value against which third-party tools and other analytic capabilities such as automated sentiment monitoring may be leveraged.

In an embodiment, the system may enable real-time selection of elements to visualize based on attentive clustering of social media. The system may facilitate selection of a stream of information based on looking at the environment, zooming in on a data element based on clustering, determining a valid emergent segmentation, and monitoring the flow of events in real time. The events may include media objects, text, key words/language, and the like. For example, the real-time selection of elements may facilitate an analysis of trends/events especially for financial purposes.

In an embodiment, a search engine may be provided that prioritizes search results being displayed to a user based on a determination of real-time attention including attention from a particular cluster or set of clusters. A user may be able to customize the prioritization of search results, such as by getting real-time attention from a particular cluster, from a particular sub-cluster, and the like.

In an embodiment, attentive clustering and related analyses may result in identifying issues, attitudes and messaging language that may be specific to discourse for a target market, and may be suitable for presentation in a report. For example, in a clustering of bloggers sympathetic to Arts in Schools, by examining intra-cluster linking patterns, it may be determined that most of the bloggers within each cluster tend to keep the discussion within their cluster except for the bloggers in the "Interesting/teachers/educators" cluster who have a tendency to spread conversation to each of the other clusters. This behavior points to an opportunity to work with these bloggers to spread messages across the space. In continuing with the example, by examining clustering related to specific keywords, websites, outlinks, objects, and the like, it may be determined that there is a broader discussion about education and education reform than about arts and arts education. Therefore, a conclusion may be that introducing an arts education message to education discussions has more potential than introducing arts education messages to arts discussions. In the report, various valence graphs may be presented, such as cluster specific term valence maps, maps of sources, outlink maps, term specific maps, issue maps, and the like. Alternatively, the report may be presented as a spreadsheet of data.

In an embodiment of the present invention, the report may feed into a method of generating a campaign blueprint for both social and upstream media sources and a method of identifying influence inter-cluster and intra-cluster in order to plan a campaign. The blueprint may include target audience, demographic details, objectives of the campaign, flow of the campaign, messaging to use in the campaign, outlinks to target, and the like. Systems and methods for measuring the success of a campaign in various online segments and generating targeted data sets identifying sub-clusters specific to a user's identity or objective are provided.

In an exemplary embodiment, the campaign tracker may track data from a variety of sources to provide closed-loop return on investment (ROI) analysis. The tool may parse the information of each website accessed by the users, keywords entered, any information about the campaign, and the like. Further, the tool may track how people react to the campaigns and which ones are most successful. The campaign tracker may track and analyze results in real-time to determine the effectiveness of the campaigns.

In addition, the tool may enable the system to generate reports for clients. The reports may include details about the campaigns such as campaign type, number of people who have viewed the campaign, any feedback from the people, and the like.

In an embodiment, analyst coding tools (ACT) and a survey integrator may support distributed metadata collection for qualitative analysis to best interpret quantitative findings. The tools may include an interactive visual interface for navigating complex data sets and harvesting content. This interface may contain an interactive proximity cluster map which can display specific node data, metadata, search results, and the like. This proximity cluster map interface may enable the user to click on nodes to see node-specific metadata and to open the node URL in a browser window or external browser. Using the tools, a user can add metadata and view metadata about any given blogger on a map. The tools enable grabbing whole sets of blogs or items to add to semantic lists, and may enable a user to define surveys so a team of human coders can open the website and fill out surveys.

In an embodiment of the present invention, a dashboard may be provided. The dashboard may combine advanced network and text analysis, real-time updates, team-based data collection and management, and the like. In the embodiment, the dashboard may also include flexible tools and interfaces for both "big picture" views and minute-by-minute updates on messages as they move through networks. Using the dashboard, a user may define bundles and track them in the aggregate through networks over time. Using the dashboard, a user may be able to see how specific media objects are doing with a particular cluster over time.

Figure 12:
FIG. 12 depicts an interactive burstmap interface

In an embodiment, the dashboard may provide a burstmap feature in which the history of selected events or sets of events over a timeframe may be displayed using a proximity cluster map. During playback, nodes in the map will light up at a time corresponding to their participation in the selected event or events. For example, at a time in playback representing a certain date, every node which linked to a particular YouTube video will light up, allowing the user to see the pattern of linking as it unfolded over time. Optionally, this burstmap feature may include a timeline view displaying event-related metrics over time, such as the number of nodes linking to a particular video. Optionally, the burstmap feature may include lists of events available for display. An example of a burstmap interface is found in FIG. 12.

The methods and systems described herein for attentive clustering and analysis may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A method, comprising:
constructing an online author network, wherein constructing the online author network comprises selecting a set of source nodes (S), a set of outlink targets (T), and a set of edges (E) between S and T defined by the at least one selected type of hyperlink from S to T during a specified time period;
deriving a set of nodes, T', by normalizing nodes in T;
transforming the online author network into a matrix of source nodes in S linked to targets in T';
partitioning the online author network into at least one set of source nodes with a similar linking history to form an attentive cluster and at least one set of outlink targets with a similar citation profile to form an outlink bundle;
generating a graphical representation of attentive clusters and/or outlink bundles in the network to enable interpretation of network features and behavior and calculation of comparative statistical measures across the attentive clusters and outlink bundles,
wherein at least one element of the graphical representation depicts a measure of an extent of a type of activity within the network; and
measuring frequencies of links between attentive clusters and outlink bundles enabling identification and measurement of large-scale regularities in the distribution of attention by online authors across sources of information.

2. The method of claim 1, wherein the element of the graphical representation uses at least one of size, thickness, color and pattern to depict a type of activity.

3. The method of claim 1, wherein attentive clusters are differentiated in the graphical representation by at least one of a color, a shape, a shading, and a size.

4. The method of claim 1, wherein the size of the element representing the attentive clusters in the graphical representation correlates with a metric.

5. The method of claim 1, wherein the nodes, targets, and edges are collected from public and private sources of information.

6. The method of claim 1, wherein constructing the matrix comprises applying at least one threshold parameter from the group consisting of: maxnodes, targetmax, nodemin, targetmin, maxlinks, and linkmin.

7. The method of claim 1, wherein constructing the matrix comprises applying a minimum threshold for the number of included nodes that must link to a target to qualify it for inclusion in the matrix.

8. The method of claim 1, wherein constructing the matrix comprises applying a minimum threshold for the number of included targets that must link to a node to qualify it for inclusion in the matrix.

9. The method of claim 1, wherein the matrix is a graph matrix.

10. The method of claim 1, wherein the nodes are normalized to a selected level of abstraction.

11. The method of claim 1, wherein the set of outlink targets (T) are selected from at least one selected type of hyperlink.

12. The method of claim 1, wherein the set of source nodes (S) are selected from at least one selected type of node.

13. The method of claim 1, further comprising, applying any lists specifying inclusion or exclusion of particular nodes.

14. A method, comprising:
constructing an online author network, wherein constructing the online author network comprises selecting a set of source nodes (S), a set of outlink targets (T), and a set of edges (E) between S and T defined by the at least one selected type of hyperlink from S to T during a specified time period;
deriving a set of nodes, T', by normalizing nodes in T;
transforming the online author network into a matrix of source nodes in S linked to targets in T';
partitioning the online author network into at least one set of source nodes with a similar linking history to form an attentive cluster and at least one set of outlink targets with a similar citation profile to form an outlink bundle; and
measuring frequencies of links between attentive clusters and outlink bundles enabling identification and measurement of large-scale regularities in the distribution of attention by online authors across sources of information.

15. The method of claim 14, further comprising:

generating a graphical representation of attentive clusters and/or outlink bundles in the network to enable interpretation of network features and behavior and calculation of comparative statistical measures across the attentive clusters and outlink bundles, wherein at least one element of the graphical representation depicts a measure of an extent of a type of activity within the network.

16. The method of claim 14, wherein the set of outlink targets (T) are selected from at least one selected type of hyperlink.

17. The method of claim 14, wherein the set of source nodes (S) are selected from at least one selected type of node.

18. The method of claim 14, wherein the nodes are normalized to a selected level of abstraction.

19. The method of claim 14, further comprising, applying any lists specifying inclusion or exclusion of particular nodes.

20. A method of attentive clustering, comprising:
defining at least one semantic bundle; and
calculating relevance scores for nodes based on that bundle; and
selecting a subset of nodes based in whole or in part on the relevance scores; and
partitioning an online author network of the subset into at least one set of source nodes with a similar linking history to form an attentive cluster and at least one set of outlink targets with a similar citation profile to form an outlink bundle.

21. A method, comprising:
partitioning an online author network into at least one set of source nodes with a similar linking history to form an attentive cluster and at least one set of outlink targets with a similar citation profile to form an outlink bundle;
generating a graphical representation of link targets, semantic events, and node-associated metadata scattered in an x-y coordinate space, wherein the dimensions of the graph are custom-defined using sets of attentive clusters grouped to represent substantive dimensions of interest for a particular analysis.

* * * * *